(12) United States Patent
Inoue et al.

(10) Patent No.: US 8,866,980 B2
(45) Date of Patent: Oct. 21, 2014

(54) DISPLAY DEVICE HAVING A BARRIER SECTION INCLUDING A SPACER ARRANGEMENT

(75) Inventors: Yuichi Inoue, Kanagawa (JP); Sho Sakamoto, Tokyo (JP); Akira Yoshikaie, Tokyo (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/441,601

(22) Filed: Apr. 6, 2012

(65) Prior Publication Data
US 2012/0268671 A1 Oct. 25, 2012

(30) Foreign Application Priority Data

Apr. 20, 2011 (JP) .................................. 2011-094267
Nov. 17, 2011 (JP) .................................. 2011-251676

(51) Int. Cl.
| | | |
|---|---|---|
| G02F 1/1335 | (2006.01) | |
| G02F 1/1347 | (2006.01) | |
| G02F 1/1339 | (2006.01) | |
| H04N 13/04 | (2006.01) | |
| G02B 27/22 | (2006.01) | |
| G02F 1/13 | (2006.01) | |

(52) U.S. Cl.
CPC ........ H04N 13/0413 (2013.01); G02F 1/13471 (2013.01); G02F 1/13394 (2013.01); G02B 27/2214 (2013.01); G02F 1/1323 (2013.01)
USPC ............................... 349/15; 349/74; 349/155

(58) Field of Classification Search
USPC ....................................... 349/15, 74, 155–157
See application file for complete search history.

(56) References Cited

U.S. PATENT DOCUMENTS

2007/0121051 A1* 5/2007 Yokoyama et al. ........... 349/156
2008/0259232 A1* 10/2008 Kim et al. ......................... 349/15
2011/0157499 A1* 6/2011 Lee et al. ......................... 349/15

FOREIGN PATENT DOCUMENTS

JP 03-119889 A 5/1991

* cited by examiner

*Primary Examiner* — Michael Caley
(74) *Attorney, Agent, or Firm* — Wolf, Greenfield & Sacks, P.C.

(57) ABSTRACT

A display device includes: a display section including a plurality of display pixels; and a barrier section including a plurality of sub-regions that allow light to transmit therethrough and block the light. The barrier section includes a pair of substrates, a liquid crystal layer interposed between the substrates, and a plurality of spacers interposed between the substrates. An array direction of the spacers adjacent to each other of the plurality of spacers is different from an array direction of the display pixels.

17 Claims, 21 Drawing Sheets

(LIGHT EMITTING SIDE)

(LIGHT INCIDENT SIDE)

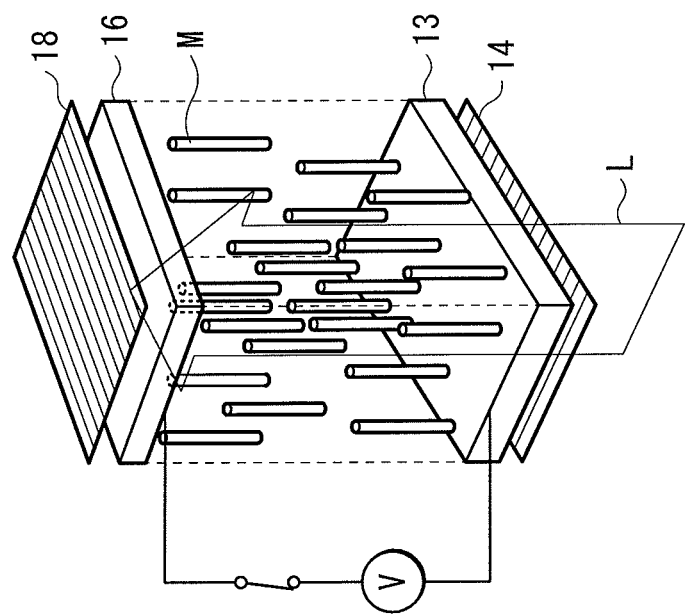
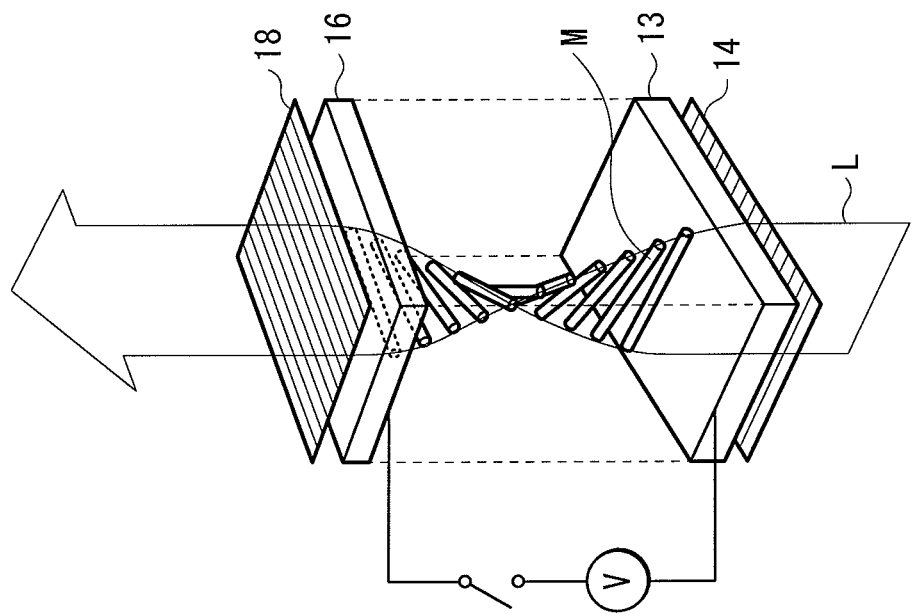
FIG. 8A
FIG. 8B

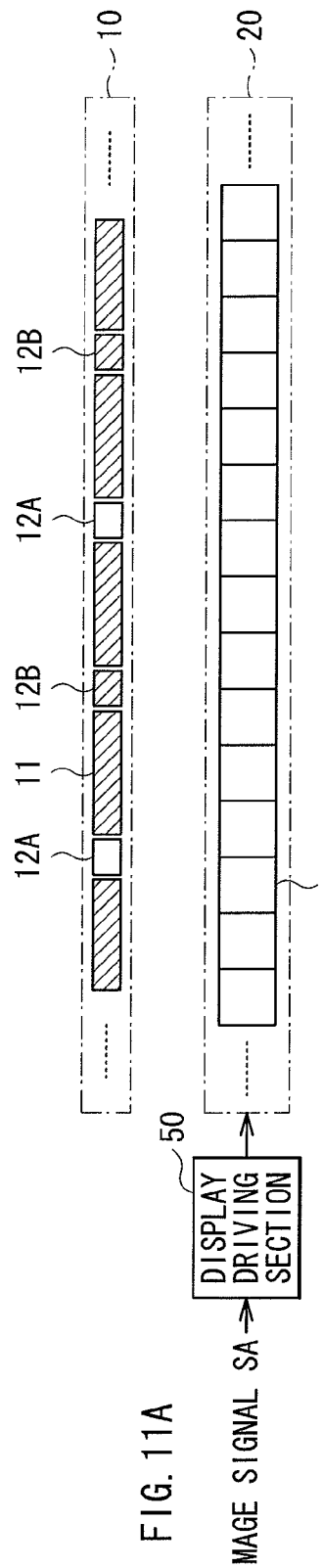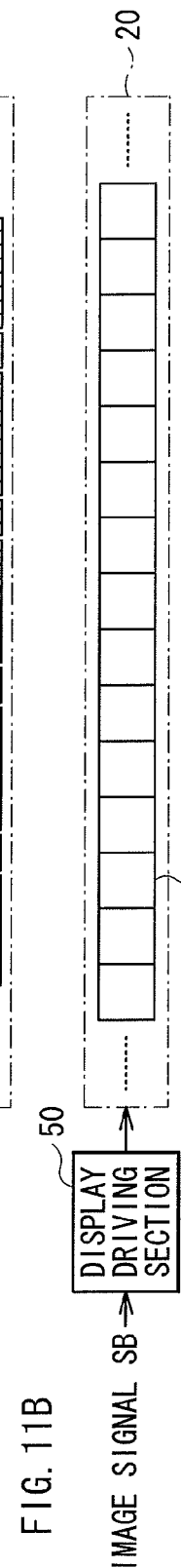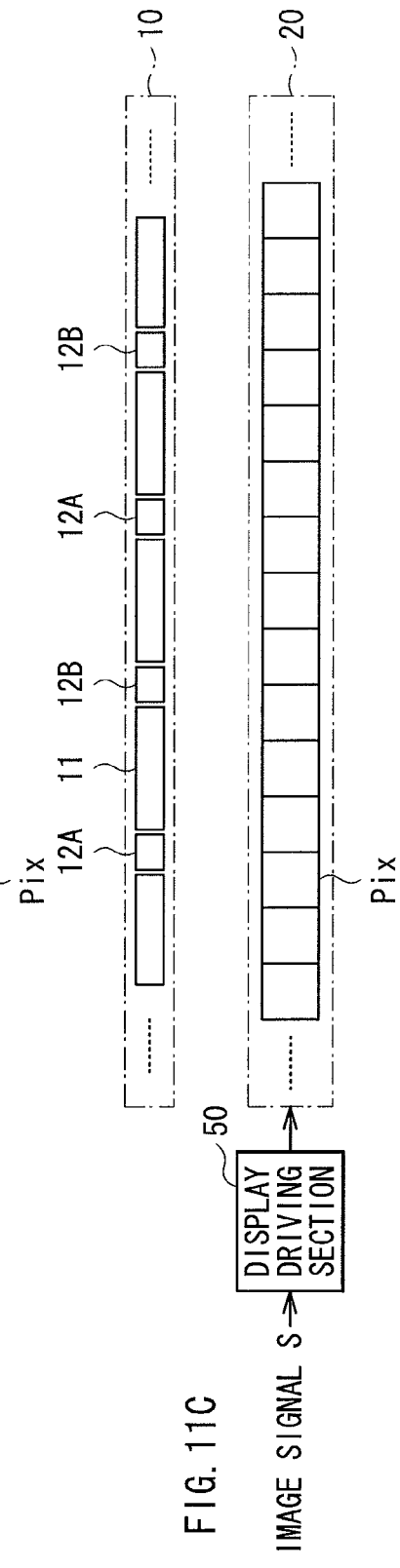

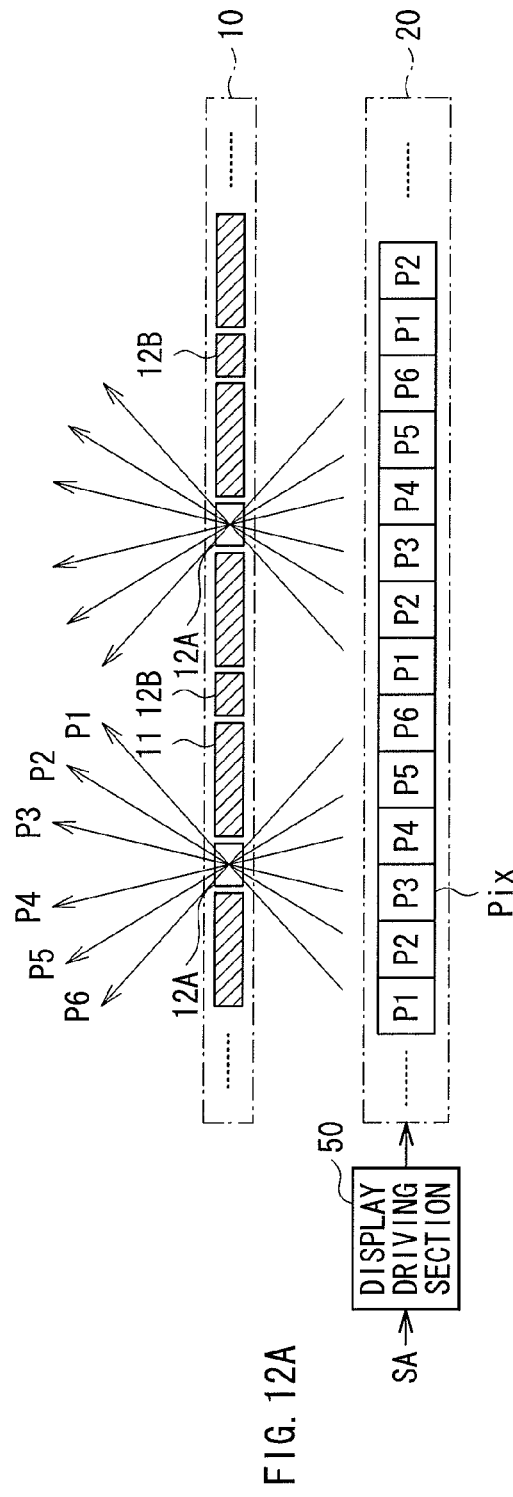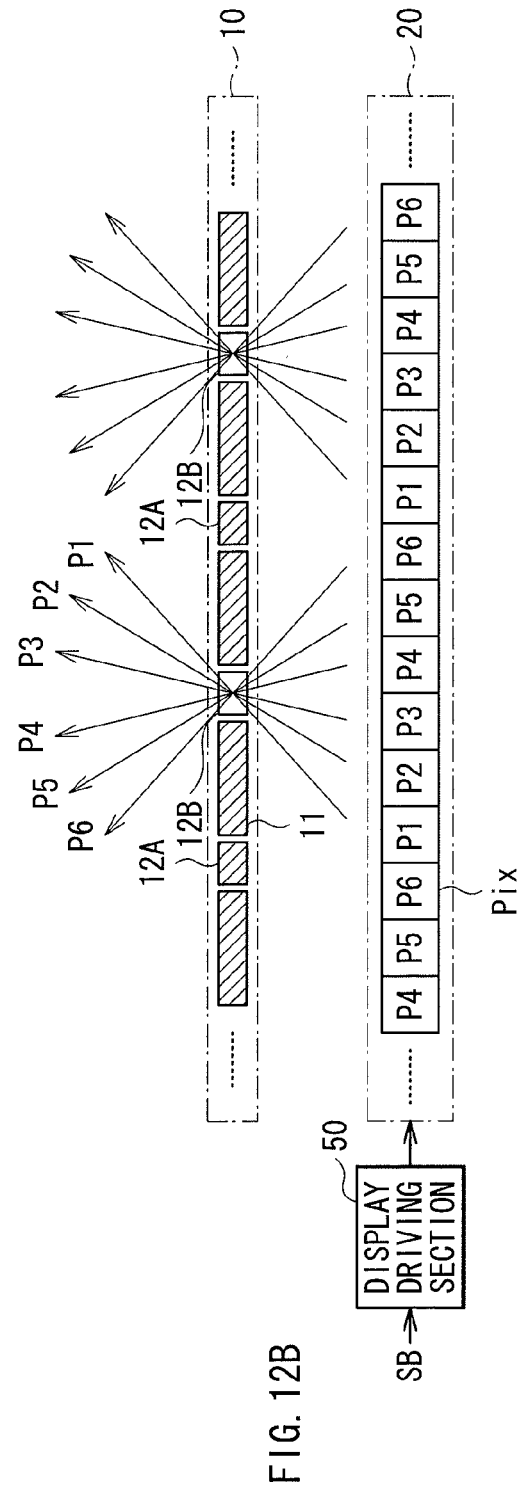

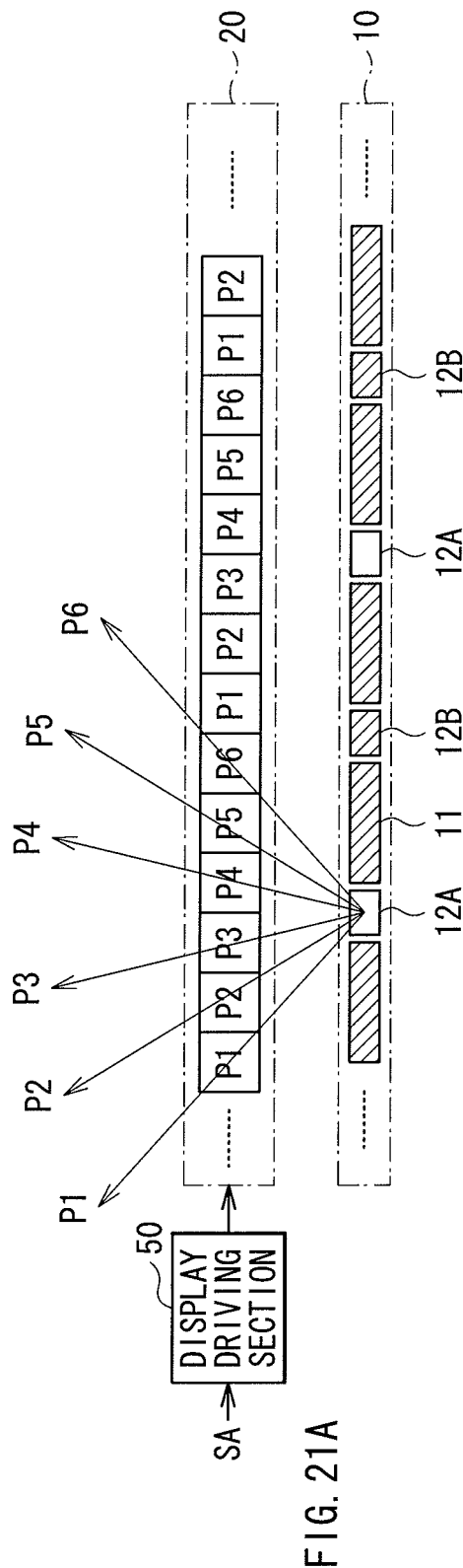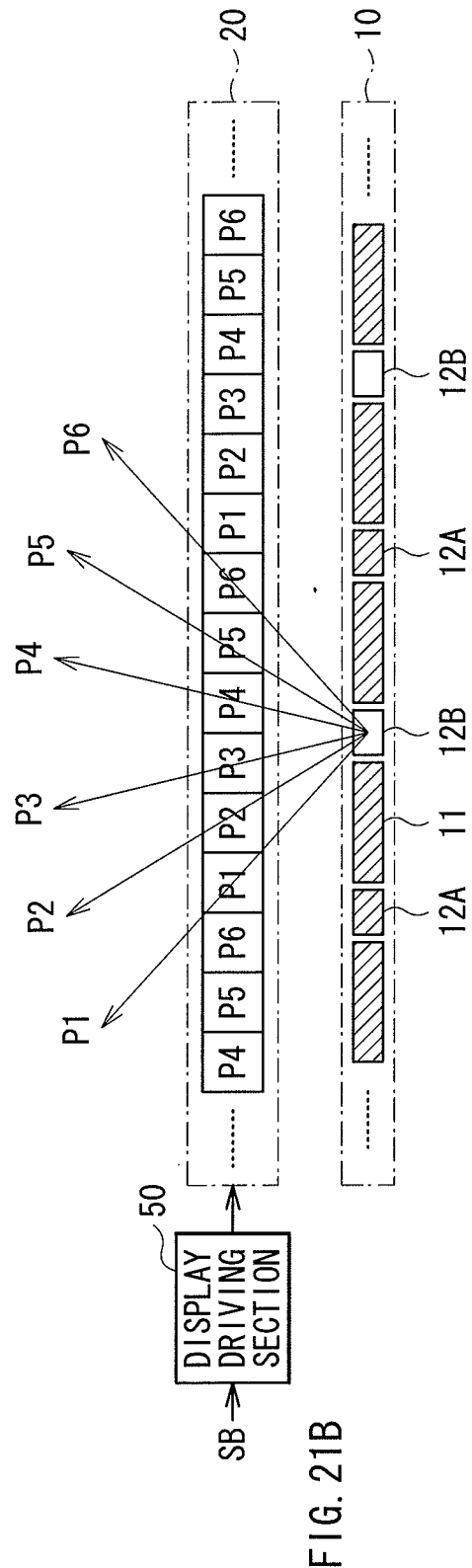

DISPLAY DEVICE HAVING A BARRIER SECTION INCLUDING A SPACER ARRANGEMENT

CROSS REFERENCES TO RELATED APPLICATIONS

The present application claims priority under 35 U.S.C. §119 to Japanese Patent Application JP 2011-094267 filed in the Japan Patent Office on Apr. 20, 2011, and to Japanese Patent Application JP 2011-251676 filed in the Japan Patent Office on Nov. 17, 2011, the entire contents of which applications are incorporated herein by reference in their entirety.

BACKGROUND

The present disclosure is related to a display device of a parallax barrier type that enables a stereoscopic display.

In recent years, display devices capable of achieving a stereoscopic display have been attracting attention. The stereoscopic display represents left-eye images and right-eye images with parallax components (different perspectives) with respect to one another, allowing viewers to recognize those images as a stereoscopic image with a stereoscopic effect by viewing each of those images with left and right eyes. Further, display devices have been also developed that ensure to provide more natural stereoscopic images to viewers by displaying three or more images with parallax components with respect to each other.

Such display devices are roughly divided into types needing the use of dedicated eyeglasses and types eliminating the use of dedicated eyeglasses, although viewers may find the use of such dedicated eyeglasses bothersome, and thus the types eliminating the use of dedicated eyeglasses are desirable. Examples of display devices eliminating the use of dedicated eyeglasses include a lenticular lens type, a parallax barrier type, and the like. In these types, a plurality of images (perspective images) with parallax components with respect to each other are displayed at the same time, which makes viewing images different depending on a relative positional relationship (angle) between a display device and viewpoints of a viewer. An example of a display device of the parallax barrier type includes a display device described in Japanese Unexamined Patent Application Publication No. H03-119889.

SUMMARY

Meanwhile, in the display devices of such as the lenticular lens type and the parallax barrier type, there may be a disadvantage in that moire would arise easily due to structure thereof. Consequently, many improvements for reducing moire have been proposed hitherto, although further improvement in the image quality has been demanded.

It is desirable to provide a display device capable of achieving an improved image.

A first display device according to an embodiment of the present disclosure includes: a display section including a plurality of display pixels; and a barrier section including a plurality of sub-regions that allow light to transmit therethrough and block the light. The barrier section includes a pair of substrates, a liquid crystal layer interposed between the substrates, and a plurality of spacers interposed between the substrates. An array direction of the spacers adjacent to each other of the plurality of spacers is different from an array direction of the display pixels.

A second display device according to an embodiment of the present disclosure includes: a display section including a plurality of display pixels; and a barrier section including a plurality of sub-regions that allow light to transmit therethrough and block the light. The barrier section includes a pair of substrates, a liquid crystal layer interposed between the substrates, and a plurality of spacers interposed between the substrates. One or more of the spacers is disposed to allow a relative position between the one or more spacers and the corresponding one or more display pixels to be different from a relative position between the other spacers and the corresponding other display pixels. For example, one or more of the spacers may be disposed to allow the relative position, in an in-plane direction, between the one or more spacers and the corresponding one or more display pixels to be different from the relative position, in the in-plane direction, between the other spacers and the corresponding other display pixels.

In the first display device according to the embodiment of the present disclosure, the spacers adjacent to each other in the barrier section that allows the light to transmit therethrough and blocks the light is arrayed in a direction different from the array direction of the display pixels in the display section. Also, in the second display device according to the embodiment of the disclosure, one or more of the spacers is disposed to allow the relative position between the one or more spacers and the corresponding one or more display pixels to be different from the relative position between the other spacers and the corresponding other display pixels. This reduces any cyclic variation in apparent luminance of image light reaching a viewer.

In the display device according to the embodiment of the present disclosure, the array direction of the display pixels in the display section and the array direction of the spacers in the barrier section do not coincide with each other, or the relative position between the spacer and the corresponding display pixel is different at least partially from the relative position between the other spacer and the corresponding other display pixel. This makes it possible to reduce any cyclic variation in the apparent luminance. Hence, it is possible to efficiently suppress generation of moire, achieving an improved image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIGS. 8A and 8B are explanatory diagrams showing an example of the array orientation of a liquid crystal layer in a transmission state and a blocking state on the liquid crystal barrier section as shown in FIG. 1.

FIGS. 11A to 11C are each a pattern diagram showing an operation example of the display section and the liquid crystal barrier section as shown in FIG. 1.

FIGS. 12A and 12B are each another pattern diagram showing an operation example of the display section and the liquid crystal barrier section as shown in FIG. 1.

FIGS. 21A and 21B are each a pattern diagram showing an operation example of the display device as shown in FIG. 20.

DETAILED DESCRIPTION

Hereinafter, embodiments of the present disclosure are described in details with reference to the drawings.
<1. First Embodiment>
[Overall Configuration]

Figure 1:
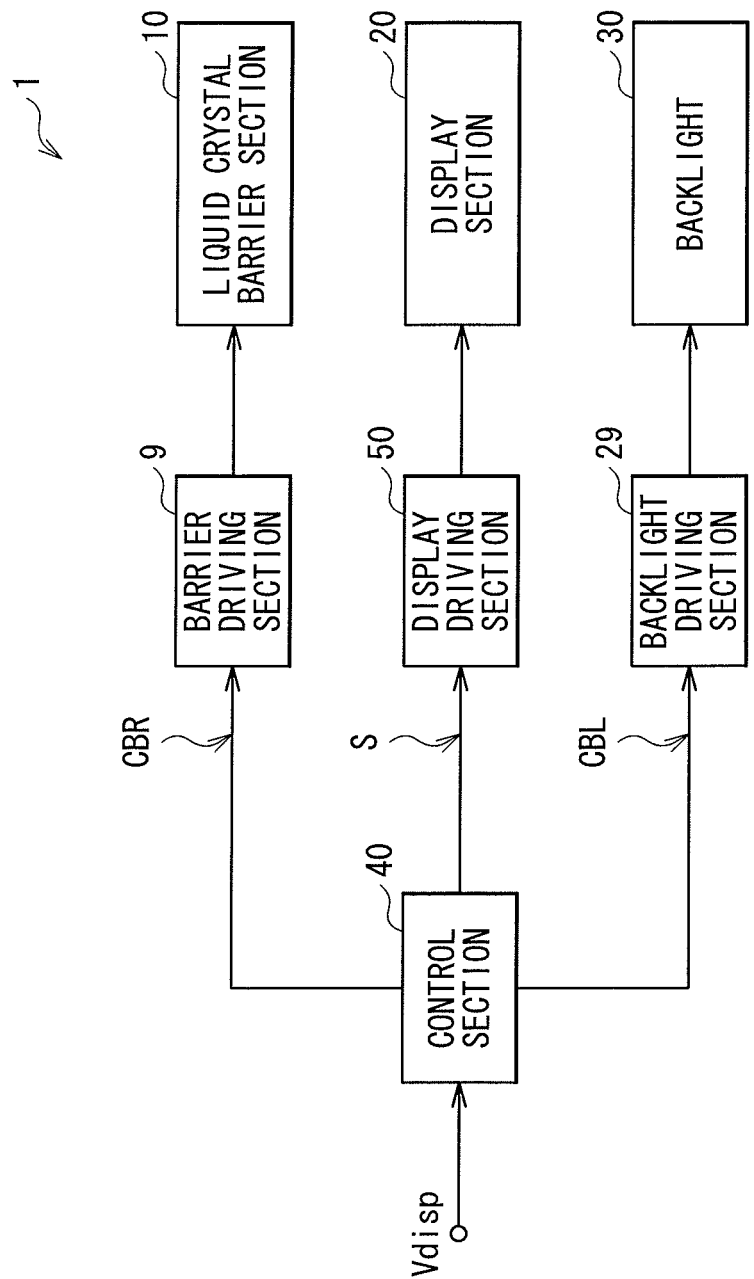
FIG. 1 is a block diagram showing a configuration example of a display device according to a first embodiment of the present disclosure.

FIG. 1 shows a configuration example of a display device 1 according to a first embodiment of the present disclosure. The display device 1 is capable of achieving both of a stereoscopic display (three-dimensional display) and a normal display (two-dimensional display). The display device 1 includes a control section 40, a display driving section 50, a display section 20, a backlight driving section 29, a backlight 30, a barrier driving section 9, and a liquid crystal barrier section 10.

The control section 40 is a circuit that provides a control signal to each of the display driving section 50, the backlight driving section 29, and the barrier driving section 9 based on an image signal Vdisp provided externally for controlling these sections to operate in synchronization with each other. In concrete terms, the control section 40 provides an image signal S based on the image signal Vdisp to the display driving section 50, and delivers a backlight control signal CBL to the backlight driving section 29, while providing a barrier control signal CBR to the barrier driving section 9. With this arrangement, when the stereoscopic display device 1 carries out a stereoscopic display operation, as described later, the image signal S is composed of image signals SA and SB each including a plurality of perspective images (six images in this example).

The display driving section 50 drives the display section 20 on the basis of the image signal S provided from the control section 40. The display section 20 carries out a display operation in a manner to modulate light emitted from the backlight 30 by driving liquid crystal elements.

The backlight driving section 29 drives the backlight 30 based on the backlight control signal provided from the control section 40. The backlight 30 has a function to project plane-emitting light to the display section 20. The backlight 30 includes, for example, an LED (Light Emitting Diode), a CCFL (Cold Cathode Fluorescent Lamp), and the like.

The barrier driving section 9 drives the liquid crystal barrier section 10 based on the barrier control signal provided from the control section 40. The liquid crystal barrier section 10 includes a plurality of opening-closing sections 11 and 12 (to be described later), each of which transmits or blocks light, having a capability to divide image light emitted out of the display section 20 toward the predetermined direction.

Figure 2A:
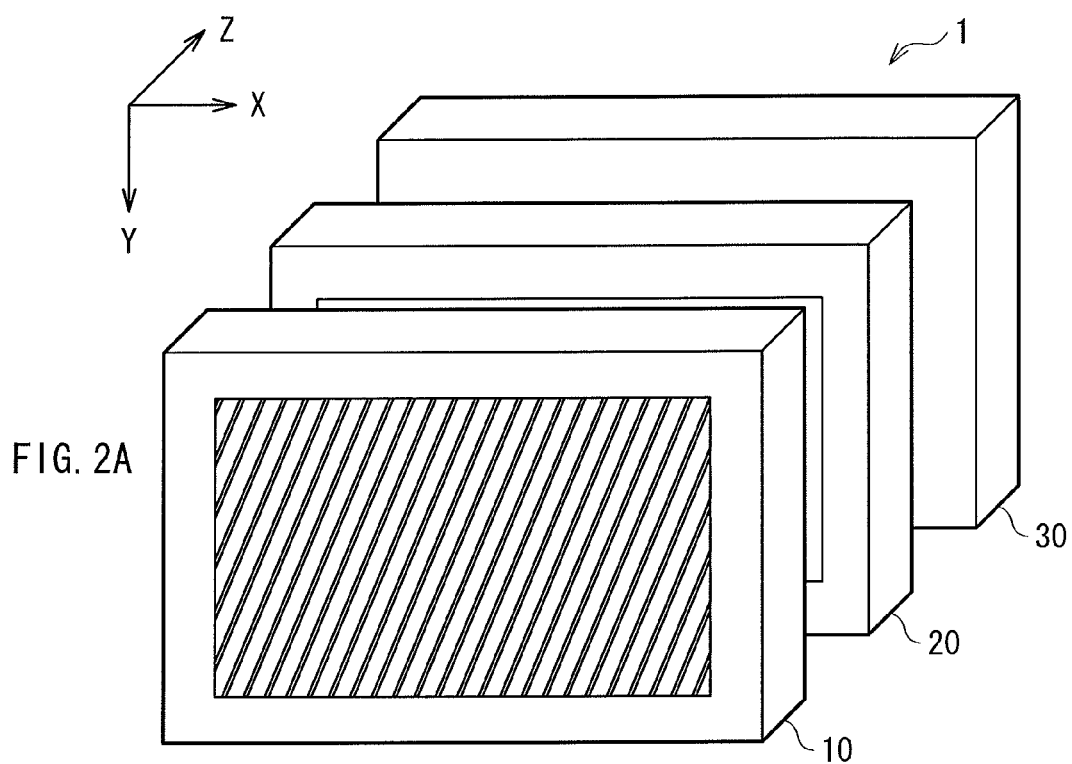
FIGS. 2A and 2B are each an explanatory diagram showing a configuration example of the display device as shown in FIG. 1.
Figure 2B:
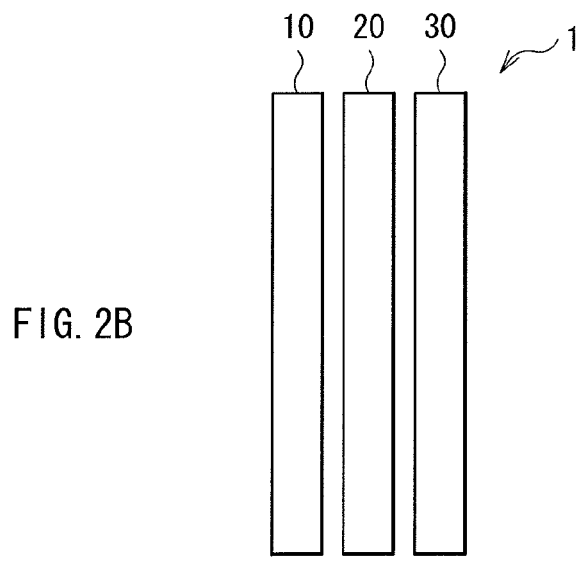

FIGS. 2A and 2B each show a configuration example of a relevant part on the display device 1, wherein FIG. 2A denotes an exploded perspective view configuration of the display device 1, while FIG. 2B denotes a side view configuration of the display device 1. As shown in FIGS. 2A and 2B, on the display device 1, each of these parts is disposed in the order of the backlight 30, the display section 20, and the liquid crystal barrier section 10. That is, the light projected from the backlight 30 reaches a viewer via the display section 20 and the liquid crystal barrier section 10 in this order. It is to be noted that the display section 20 and the liquid crystal barrier section 10 may be or may not be attached to one another.
(Display Driving Section 50 and Display Section 20)

Figure 3:
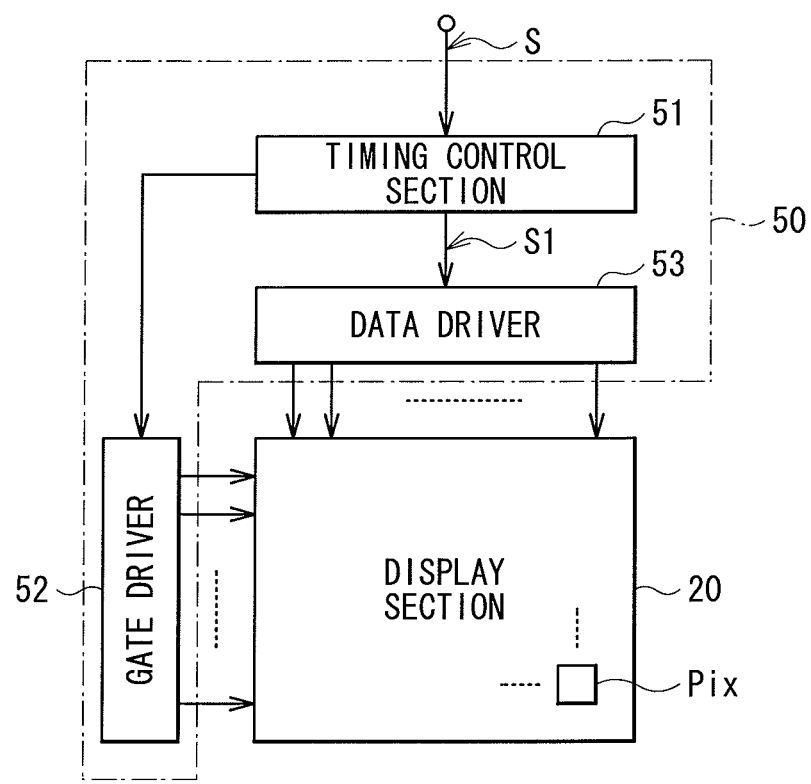
FIG. 3 is an explanatory diagram showing a configuration example of a display section and a display driving section as shown in FIG. 1.

FIG. 3 shows an example of a block diagram for the display driving section 50 and the display section 20. Pixels Pix are disposed in a matrix pattern on the display section 20. The display driving section 50 includes a timing control section 51, a gate driver 52, and a data driver 53. The timing control section 51 controls a drive timing for the gate driver 52 and the data driver 53, while providing the image signal S delivered from the control section 40 to the data driver 53 as an image signal S1. The gate driver 52 sequentially selects the pixels Pix (to be described later) within a liquid crystal display device 45 for each row for sequential line scanning under a timing control performed by the timing control section 51. The data driver 53 provides a pixel signal based on the image signal S1 to each of the pixels Pix within the display section 20. In concrete terms, the data driver 53 generates the pixel signal in an analog signal form by performing D/A (digital/analog) conversion based on the image signal S1, providing the resultant pixel signal to each of the pixels Pix.

The display section 20 seals a liquid crystal material between two pieces of transparent substrates made of a glass for example. At a portion facing the liquid crystal material on these transparent substrates, transparent electrodes made of a material such as ITO (Indium Tin Oxide) are formed to compose the pixels Pix together with the liquid crystal material. Hereinafter, the configuration of the display section 20 (pixels Pix) is described in details.

Figure 4A:
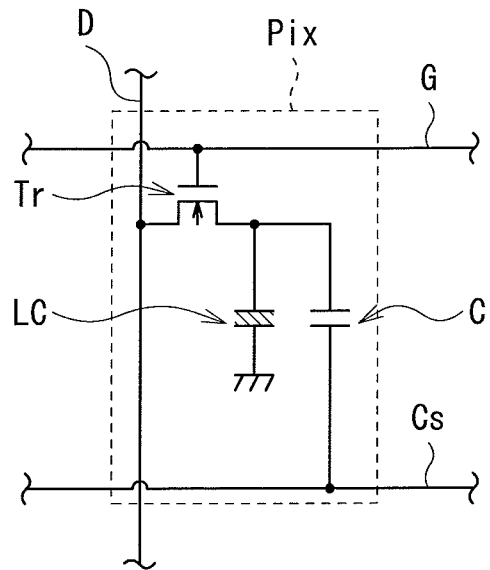
FIGS. 4A and 4B are explanatory diagrams showing a configuration example of a pixel circuit and a cross-sectional surface structure example of a pixel as shown in FIG. 3.

FIG. 4A shows an example of a circuit diagram for the pixel Pix. The pixel Pix includes a TFT (Thin Film Transistor) element Tr, a liquid crystal element LC, and a holding capacitor element C. The TFT element Tr is composed of, for example, a MOS-FET (Metal Oxide Semiconductor-Field Effect Transistor) with a gate connected to a gate line G, a source connected to a data line D, and a drain connected to a first end of the liquid crystal element LC and a first end of the holding capacitor element C, respectively. For the liquid crystal element LC, the first end is connected to the drain of the TFT element Tr, while a second end is grounded. For the holding capacitor element C, the first end is connected to the drain of the TFT element Tr, while a second end is connected to a holding capacitor line Cs. The gate line G is connected to the gate driver 52, and the data line D is connected to the data driver 53.

Figure 4B:
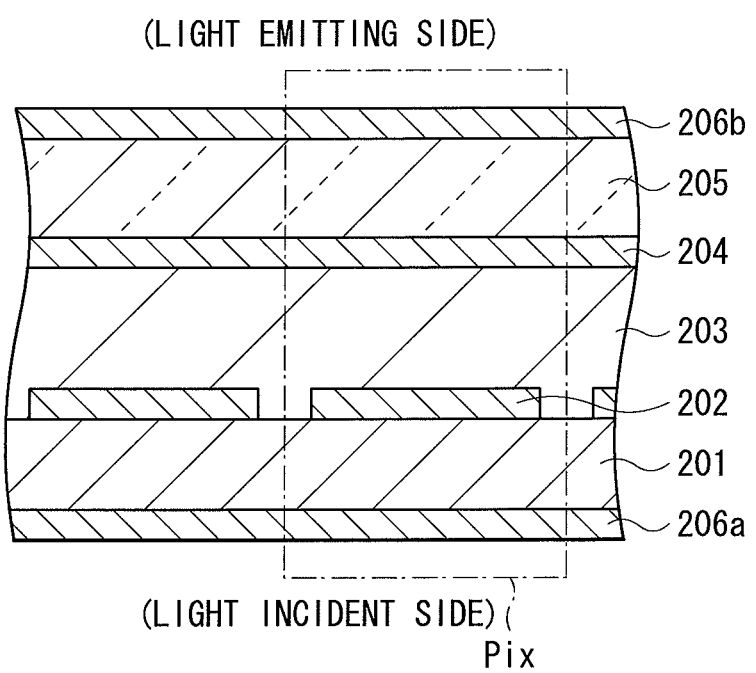

FIG. 4B shows a cross-sectional surface structure of the display section 20 including the pixels Pix. As can be seen from the cross-sectional surface, the display section 20 seals a liquid crystal layer 203 between a drive substrate 201 and a counter substrate 205. The drive substrate 201 forms a pixel driver circuit including the above-described TFT element Tr, wherein a pixel electrode 202 is arranged for each of the pixels Pix on the drive substrate 201. On the counter substrate 205, a color filter and a black matrix that are not shown in the figure are formed, and further on the surface of the liquid crystal layer 203 side, an opposite electrode 204 is arranged as an electrode common to each of the pixels Pix. At the light incident side (backlight 30 side in this case) and the light emitting side (liquid crystal barrier section 10 side in this case) on the display section 20, polarizing plates 206a and 206b are attached to one another to become a cross-nicol or parallel-nicol with each other.

Figure 5:
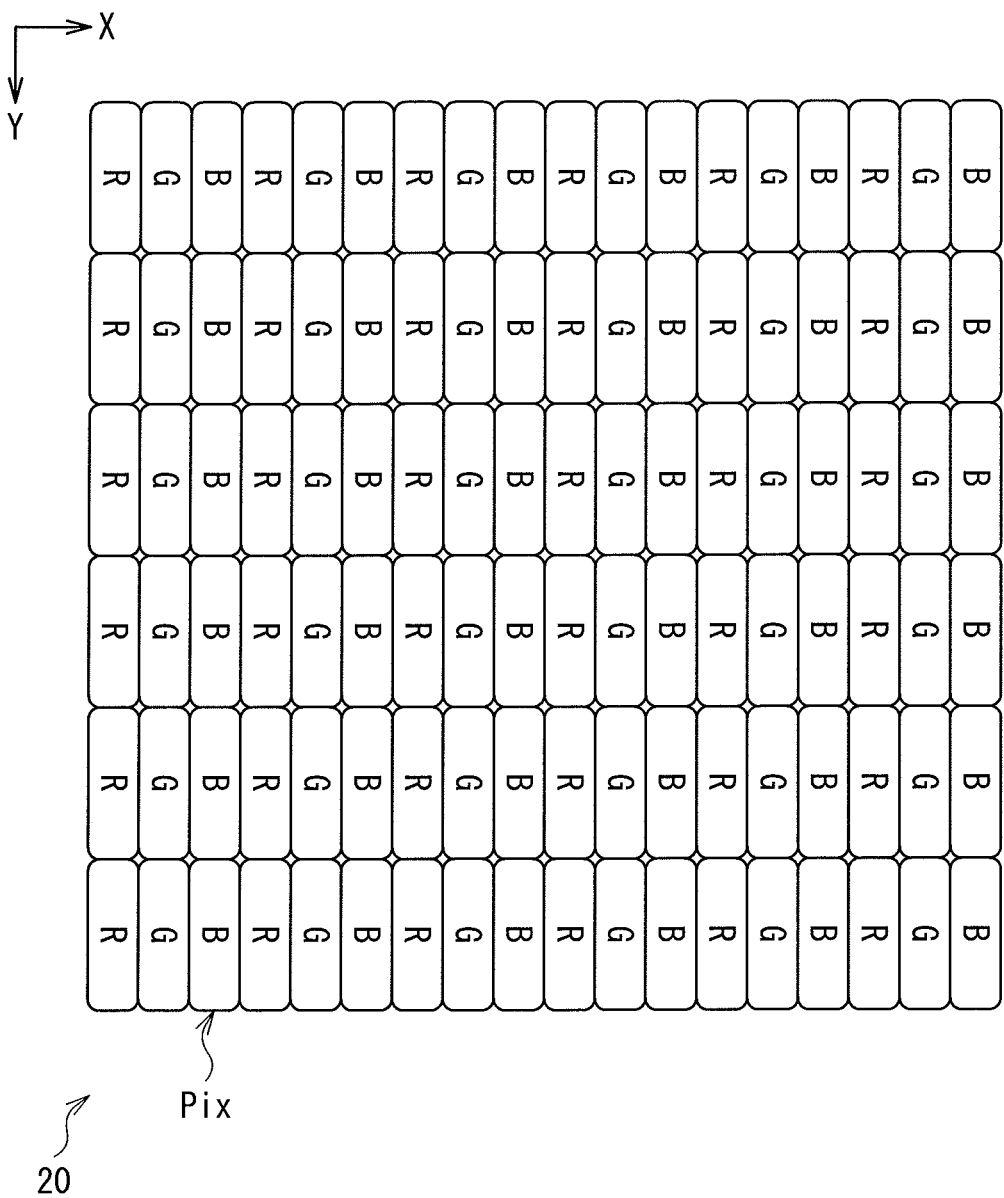
FIG. 5 is a plan view showing a configuration example of the pixel array on the display section as shown in FIG. 1.

FIG. 5 shows a configuration example of the pixel arrangement for the display section 20. As shown in FIG. 5, the pixels Pix are arranged in a matrix pattern within a plane in parallel with the drive substrate 201 and the counter substrate 205 (within X-Y plane). In concrete terms, the display section 20 has a pixel structure in which a plurality of three-color pixels Pix (indicated as R, G, and B) of R (red color), G (green color), and B (blue color) that are necessary for color display are arranged in a two-dimensional array. As shown in FIG. 5, the pixels are arranged so that the pixels Pix of each color appear periodically on the same row in the horizontal direction of a screen (X-axis direction), while the pixels Pix of the same color are arrayed on the same row in the vertical direction of a screen (Y-axis direction). Each of a plurality of the gate lines G from the gate driver 52 extends along an array of the pixels Pix in the X-axis direction for example, whereas each of a plurality of the data lines D from the data driver 53 extends along an array of the pixels Pix in the Y-axis direction for example. In such a manner, on the display section 20, a plurality of the data lines D and the gate lines G are provided as signal lines and scanning lines respectively for supplying a voltage to each of the pixels Pix, wherein the pixels Pix are arranged in a matrix pattern along those data lines D and gate lines G.

(Backlight 30)

The backlight 30 is composed of a device such as an LED (Light Emitting Diode) mounted on a side surface of an optical waveguide for example. Alternatively, the backlight 30 may have a configuration in which a plurality of CCFLs (Cold Cathode Fluorescent Lamp) and the like are arrayed, for example.

(Liquid Crystal Barrier Section 10)

Figure 6:
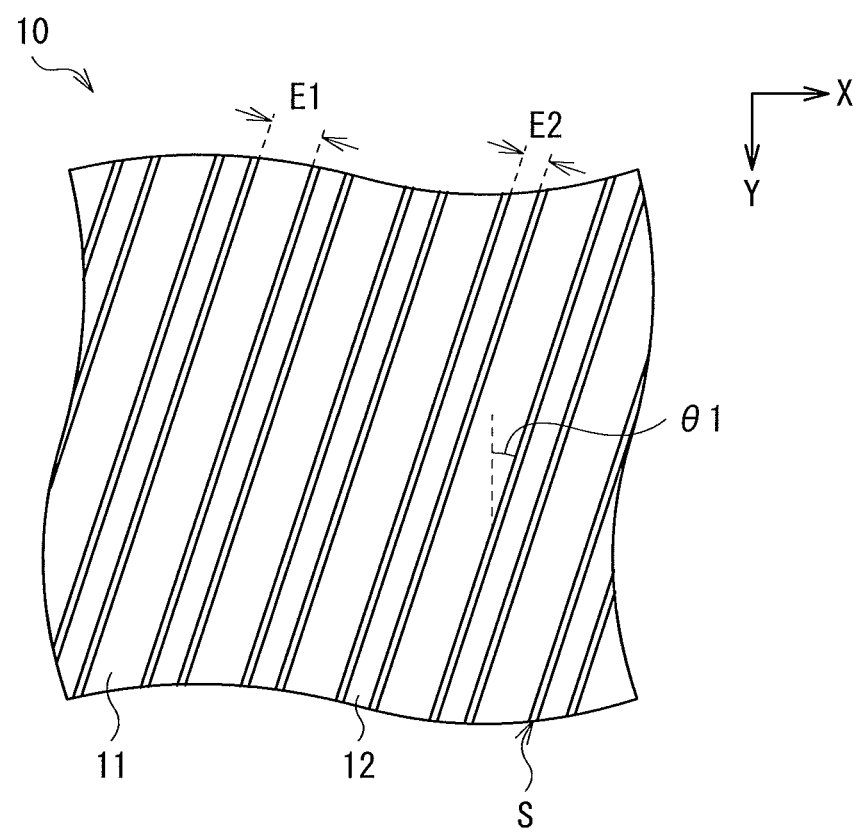
FIG. 6 is an explanatory diagram showing a configuration example of opening-closing sections on a liquid crystal barrier section as shown in FIG. 1.
Figure 7A:
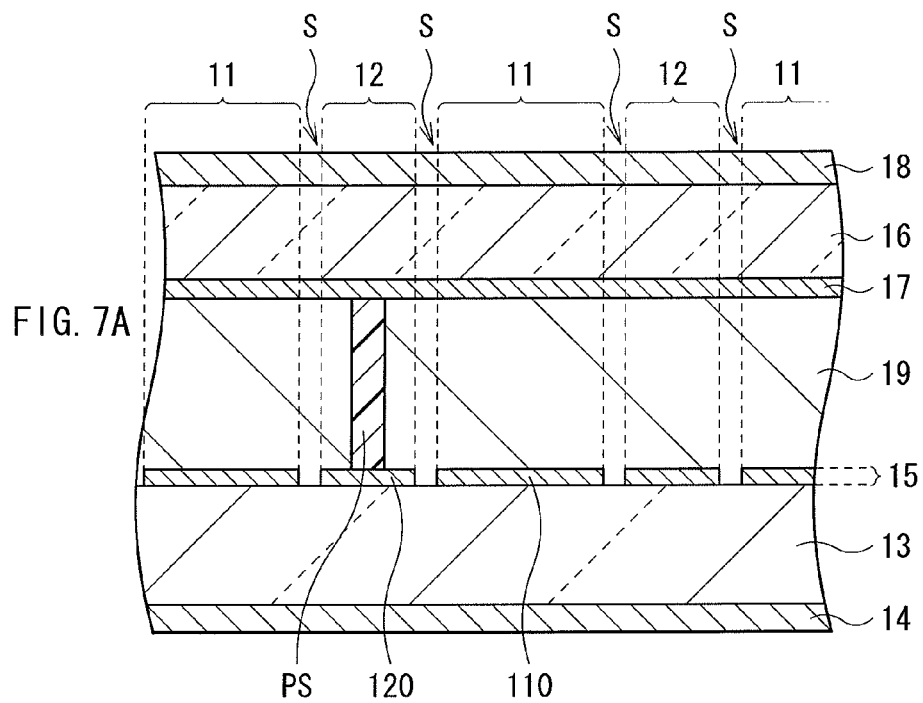
FIGS. 7A and 7B are pattern diagrams showing a cross-sectional surface structure example and a planar surface structure example of the liquid crystal barrier section as shown in FIG. 1.
Figure 7B:
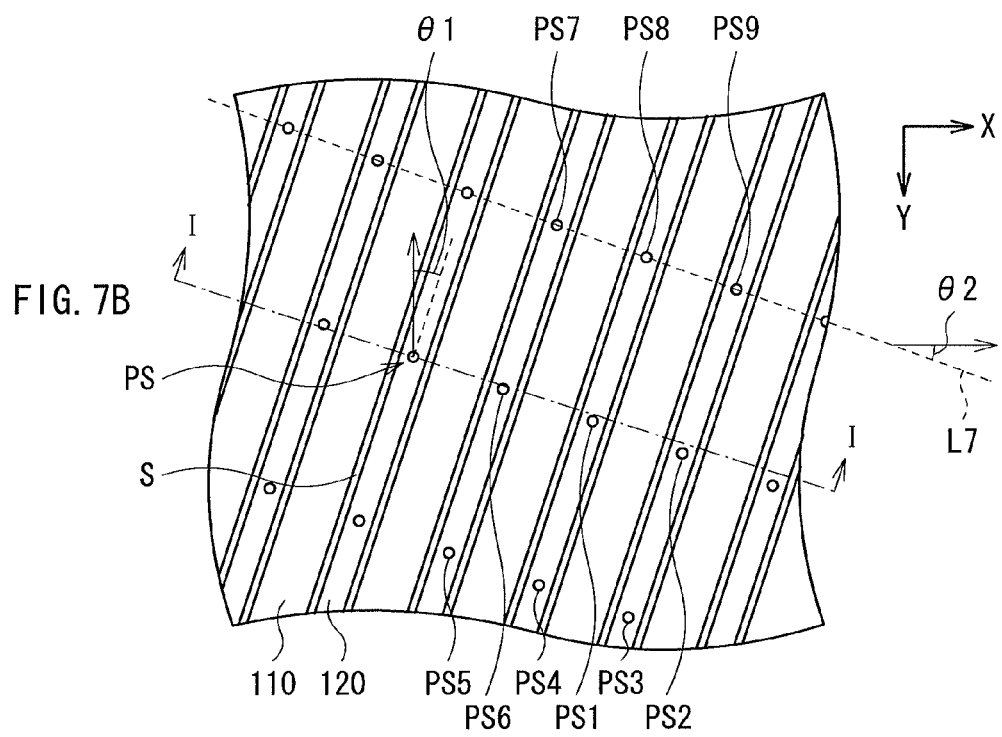

FIG. 6 shows an arrangement configuration example of opening-closing sections on the liquid crystal barrier section 10. FIG. 7A is a schematic view of a cross-sectional surface structure for the liquid crystal barrier section 10, while FIG. 7B is an X-Y plane pattern diagram illustrating the positional relationship between a transparent electrode layer 15 and spacers PS. FIG. 7A is a cross-sectional diagram in the arrow-view direction along I-I line in FIG. 7B.

The liquid crystal barrier section 10, which is so-called a parallax barrier, has a plurality of opening-closing sections 11 (second sub-region) and opening-closing sections 12 (first sub-region) to transmit or block light as shown in FIG. 5. These opening-closing sections 11 and 12 perform different operation depending on whether the display device 1 carries out either a normal display (two-dimensional display) or a stereoscopic display (three-dimensional display). In concrete terms, as described later, the opening-closing sections 11 are placed into an open state (transmission state) during a normal display, and are placed into an closed state (blocking state) during a stereoscopic display. As described later, the opening-closing sections 12 are placed into an open state (transmission state) during a normal display, and perform a switching operation on a time-division basis during a stereoscopic display. A plurality of these opening-closing sections 11 and 12 are provided alternately, and for example, driving may be carried out for each group composed of selective switches among a plurality of the opening-closing sections 11 and 12, or such a group-based driving may be performed on a time-division basis.

These opening-closing sections 11 and 12 are provided to extend in one direction (for example, a direction forming a predetermined angle 01 relative to the Y-axis direction in this case) on the X-Y plane with border portions S interposed between them. A width E1 of the opening-closing section 11 and a width E2 of the opening-closing section 12 are different from each other, wherein a relation of, for example, E1>E2 is maintained in this case. However, a magnitude relation in the width of the opening-closing sections 11 and 12 is not limited thereto, and a relation of E1<E2 or E1=E2 may be also permitted alternatively. The border portion S is, for example, a portion corresponding to a groove (slit) between transparent electrodes 110 and 120 to be described later. Such opening-closing sections 11 and 12 include a liquid crystal layer (liquid crystal layer 19 to be described later), performing a switching operation depending on a drive voltage provided to the liquid crystal layer 19.

In concrete terms, as shown in FIG. 7A, the liquid crystal barrier section 10 includes the liquid crystal layer 19 between a transparent substrate 13 and a transparent substrate 16 that are made of, for example, a glass. In this example, the transparent substrate 13 is disposed at the light incident side, and the transparent substrate 16 is disposed at the light emitting side. Transparent electrode layers 15 and 17 that are made of, for example, ITO are formed respectively at the surface of the liquid crystal layer 19 side on the transparent substrate 13 and at the surface of the liquid crystal layer 19 side on the transparent substrate 16. At the light incident side on the transparent substrate 13 and the light emitting side on the transparent substrate 16, polarizing plates 14 and 18 are attached to one another. Hereinafter, the configuration of each component part is described in details.

The liquid crystal layer 19 is composed of a TN mode liquid crystal (TN liquid crystal) for example. In this embodiment of the present disclosure, the description is provided by taking a case where the liquid crystal layer 19 is driven in a normally white mode as an example. The liquid crystal layer 19 transmits light as shown in FIG. 8A in a state where no drive voltage is applied for example, resulting in a white display being performed. On the other hand, the liquid crystal layer 19 blocks light as shown in FIG. 8B in a state where a drive voltage is applied, resulting in a black display being performed. In particular, at the time of a white display in which no drive voltage is applied, directors of liquid crystal molecules M are orthogonal to each other between the light incident side and light emitting side, being arrayed to turn over while rotating gradually along the thickness direction of the liquid crystal layer 19. On the contrary, at the time of a black display in which a drive voltage is applied, the directors of the liquid crystal molecules M are arrayed along the thickness direction of the liquid crystal layer 19.

The transparent electrode layer 15 is divided into a plurality of transparent electrodes 110 and 120 to which a voltage is allowed to be supplied individually. On the other hand, the transparent electrode layer 17 is provided as an electrode common to each of the transparent electrodes 110 and 120. In this example, 0 V is applied to the transparent electrode layer 17. The transparent electrode 110 on the transparent electrode layer 15 and a portion corresponding to that transparent electrode 110 on the transparent electrode layer 17 compose the opening-closing sections 11 as a sub-region. Similarly, the transparent electrode 120 on the transparent electrode layer 15 and a portion corresponding to that transparent electrode 120 on the transparent electrode layer 17 compose the opening-closing sections 12 as a sub-region. With such an arrangement, on the liquid crystal barrier section 10, a voltage is selectively applied to the transparent electrodes 110 and 120, and the liquid crystal layer 19 is placed into a liquid crystal alignment state in accordance with the applied voltage, thereby allowing the open/closed operation to be performed for each of the opening-closing sections 11 and 12. At the liquid crystal layer 19 side surface on each of these transparent electrode layers 15 and 17, an alignment film that is not shown in the figure is formed.

The polarizing plates 14 and 18 control a polarization direction each of incoming light and outgoing light to/from the liquid crystal layer 19. A transmission axis of the polarizing plate 14 is disposed in the X-axis direction for example, while a transmission axis of the polarizing plate 18 is disposed in the Y-axis direction for example. That is, each transmission axis of the polarizing plates 14 and 18 is disposed to be orthogonal to one another.

(Arrangement of Spacers PS)

On such a liquid crystal barrier section 10, tiny spacers PS for controlling a thickness of the liquid crystal layer 19 are inserted between the transparent substrate 13 and the transparent substrate 16. The spacers PS are composed of resin with the optical transparency such as a photoresist, and are molded in the shape of a column such as a cylindrical column. As shown in FIGS. 7A and 7B, the spacers PS are provided at a plurality of selective regions at the X-Y plane on the liquid crystal barrier section 10, to be specific, at regions excluding the border portions S (non-border portions of the opening-closing sections 11 and 12). According to this embodiment of the present disclosure, each of the spacers PS is disposed to overlap with the transparent electrode 120 in the thickness direction (light-transmitting direction) (at the center on the transparent electrode 120 in FIGS. 7A and 7B). In other words, each of the spacers PS is disposed not to stride across regions (border portions S) between the transparent electrodes 110 and 120. Further, each of the spacers PS is disposed in the direction different from the array direction of the pixels Pix on the display section 20. That is, the pixels Pix are arrayed along the X-axis direction and Y-axis direction, whereas the adjacent spacers PS are placed side by side in the direction intersecting with both of the X-axis direction and Y-axis direction. In concrete terms, for example, the spacers PS are arrayed along the transparent electrode 120 extending at a slant to form an angle θ1 (for example, 18 degrees) relative to the X-axis direction. Further, the spacers PS provided on the adjoining transparent electrodes 120 with the transparent electrode 110 interposed between are arrayed along a virtual line L7 inclined at an angle θ2 (for example, 26 degrees) relative to the X-axis direction. More specifically, a plurality of the spacers PS have the following positioning relationship. For example, if an arbitrary spacer PS1 is used as the basis, the spacers PS2 to PS9 that are adjacent to the spacer PS1 are present in the surrounding area. In this case, the direction where the spacer PS1 and the spacer PS2 are arrayed, that is, a line connecting the spacer PS1 and the spacer PS2 is different from both of the X-axis direction and Y-axis direction. This is also true for the relationship between the spacer PS1 and each of the spacers PS3 to PS9. It is to be noted that most preferably the relationship between an arbitrary spacer PS on a screen and any other adjacent spacers PS is maintained as a relationship described above. However, at least, the array direction of two spacers PS located at the closest position to each other (for example, the spacer PS1 and the spacer PS2 (or PS3)) may be different from that of the pixels Pix.

It is to be noted that the liquid crystal barrier section 10 performs a normally white operation in this example, although a display operation is not limited thereto. Alternatively, the liquid crystal barrier section 10 may perform a normally black operation for example. It is possible to set a selection of the normally black operation and normally white operation by the use of the polarizing plates and liquid crystal alignment.

Figure 9:
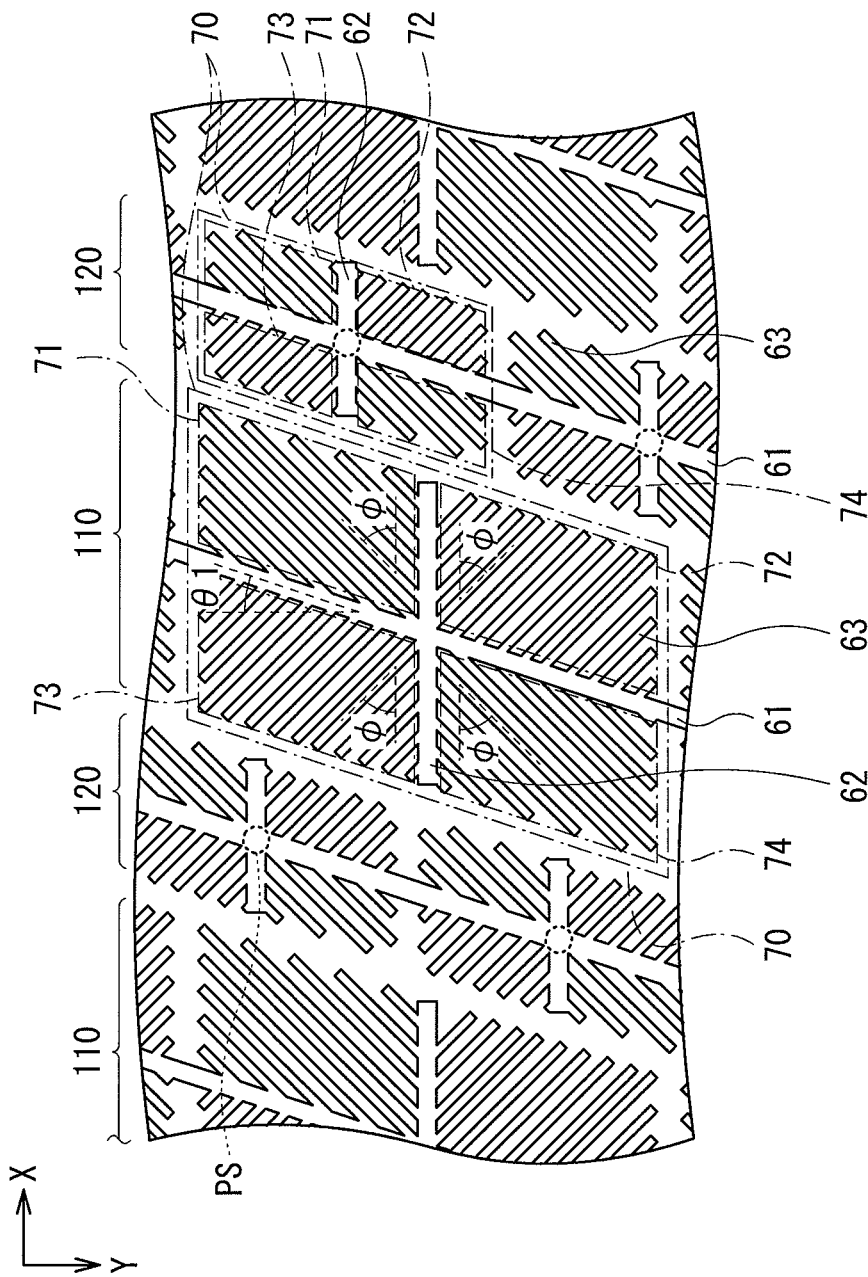
FIG. 9 is a plan view showing a configuration example of a transparent electrode related to the liquid crystal barrier section as shown in FIG. 1.

Further, in this embodiment of the present disclosure, the liquid crystal layer 19 may be composed of a vertical alignment (VA) mode liquid crystal (VA liquid crystal) instead of the TN mode liquid crystal (TN liquid crystal). When the VA liquid crystal is to be used, the following electrode pattern may be employed to dispose the spacers PS in the predetermined positions. FIG. 9 shows a configuration example of the transparent electrodes 110 and 120 on the transparent electrode layer 15. Each of the transparent electrodes 110 and 120 has a stem portion 61 extending in the same direction as the extending direction of the opening-closing sections 11 and 12 (direction forming the angle θ1 relative to the Y-axis direction). On each of the transparent electrodes 110 and 120, a sub-electrode region 70 is provided side by side along the extending direction of the stem portion 61. Each sub-electrode region 70 has a stem portion 62 and branch portions 63. The stem portion 62 is formed to extend in a direction intersecting with the stem portion 61, extending in the horizontal direction X in this example. On each sub-electrode region 70, there are provided four branch regions (domains) 71 to 74 that are separated from the stem portion 61 and the stem portion 62. Further, the spacers PS are provided at each intersection of the stem portion 61 and the stem portion 62.

The branch portions 63 are formed to extend from the stem portions 61 and 62 in each of the branch regions 71 to 74. A line width of each of the branch portions 63 is equal to each other in the branch regions 71 to 74. Similarly, a slit width of each of the branch portions 63 is also equal to each other in the branch regions 71 to 74. The branch portions 63 in each of the branch regions 71 to 74 extend in the same direction within each region. The extending direction of the branch portions 63 in the branch region 71 and the extending direction of the branch portions 63 in the branch region 73 are symmetric with respect to the Y-axis direction as an axis. Similarly, the extending direction of the branch portions 63 in the branch region 72 and the extending direction of the branch portions 63 in the branch region 74 are symmetric with respect to the Y-axis direction as an axis. In other words, the extending direction of the branch portions 63 in the branch region 71 and the extending direction of the branch portions 63 in the branch region 73 are asymmetric with respect to the stem portion 61 as an axis, while the extending direction of the branch portions 63 in the branch region 72 and the extending direction of the branch portions 63 in the branch region 74 are asymmetric with respect to the stem portion 61 as an axis. Further, the extending direction of the branch portions 63 in the branch region 71 and the extending direction of the branch portions 63 in the branch region 72 are symmetric with respect to the stem portion 62 (X-axis direction) as an axis. Similarly, the extending direction of the branch portions 63 in the branch region 73 and the extending direction of the branch portions 63 in the branch region 74 are symmetric with respect to the stem portion 62 (X-axis direction) as an axis. In this example, in concrete terms, the branch portions 63 in the branch regions 71 and 74 extend in the direction rotated at a predetermined angle $\phi$ counterclockwise from the X-axis direction, while the branch portions 63 in the branch regions 72 and 73 extend in the direction rotated at a predetermined angle $\phi$ clockwise from the X-axis direction. It is desirable that the angle $\phi$ be 45 degrees for example.

With such an arrangement, when the VA liquid crystal is used, if a voltage is applied to the transparent electrode layer 15 (transparent electrodes 110 and 120) and the transparent electrode layer 17, as the potential difference becomes large, the light transmittance on the liquid crystal layer 19 increases, resulting in the opening-closing sections 11 and 12 being placed into a transmission state (open state). On the other hand, as the potential difference becomes small, the light transmittance on the liquid crystal layer 19 decreases, resulting in the opening-closing sections 11 and 12 being placed into a blocking state (closed state).

On the liquid crystal barrier section 10, a plurality of the opening-closing sections 12 form groups, wherein a plurality of the opening-closing sections 12 belonging to the same group perform open and closed operations at the same timing in carrying out a stereoscopic display. Hereinafter, groups of the opening-closing sections 12 are described.

Figure 10:
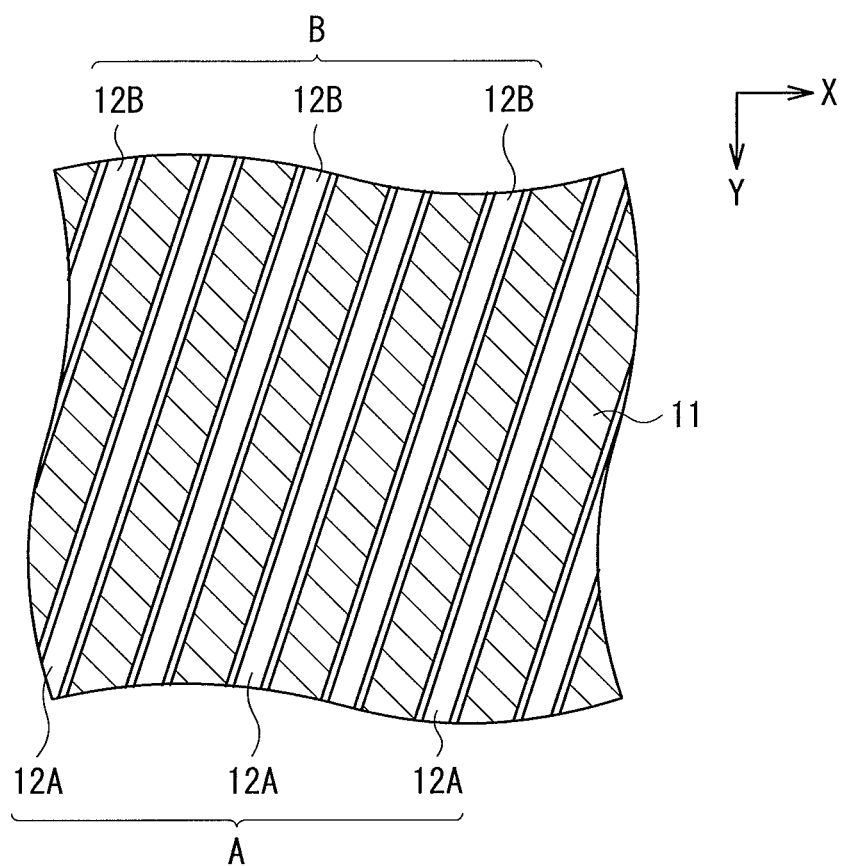
FIG. 10 is an explanatory diagram showing a group configuration example of the liquid crystal barrier section as shown in FIG. 1.

FIG. 10 shows a group configuration example of the opening-closing sections 12. In this example, the opening-closing sections 12 form two groups. In particular, a plurality of the opening-closing sections 12 that are arranged alternately compose a group A and a group B. It is to be noted that opening-closing sections 12A are used as appropriate as a generic term of the opening-closing sections 12 belonging to the group A, and similarly opening-closing sections 12B are used as appropriate as a generic term of the opening-closing sections 12 belonging to the group B.

The barrier driving section 9 drives a plurality of the opening-closing sections 12 belonging to the same group to perform open/closed operations at the same timing in carrying out a stereoscopic display. In particular, as described later, the barrier driving section 9 drives a plurality of the opening-closing sections 12A belonging to the group A and a plurality of the opening-closing sections 12B belonging to the group B to perform open/closed operations alternately on a time-division basis.

FIGS. 11A to 11C each show status of the liquid crystal barrier section 10 in carrying out a stereoscopic display and a normal display (two-dimensional display) as a pattern diagram using a cross-sectional surface structure, wherein FIG. 11A denotes a state in performing a stereoscopic display, and FIG. 11B denotes another state in performing a stereoscopic display, while FIG. 11C denotes a state in performing a normal display. On the liquid crystal barrier section 10, the opening-closing sections 11 and the opening-closing sections 12 (opening-closing sections 12A and 12B) are disposed alternately. FIG. 10 shows an example of a case where the opening-closing sections 12A are provided at a rate of one piece per six pixels Pix. In the same way, the opening-closing sections 12B are provided at a rate of one piece per six pixels Pix as well.

In carrying out a stereoscopic display, image signals SA and SB are alternately supplied to the display driving section 50, and the display section 20 performs an image display operation based on such supplied image signals on a time-division basis. At this time, on the liquid crystal barrier section 10, the opening-closing sections 12 (opening-closing sections 12A and 12B) perform open/closed operations on a time-division basis in synchronization with the image display on a time-division basis, while the opening-closing sections 11 are kept in a closed state (blocking state). In concrete terms, when the image signal SA is provided, as shown in FIG. 11A, the opening-closing sections 12A are put in an open state, while the opening-closing sections 12B are put in an closed state. On the display section 20, as described later, six pixels Pix that are arranged adjacently to each other at positions corresponding to the opening-closing sections 12A carry out a display operation corresponding to six perspective images included in the image signal SA. Consequently, as described later, a viewer sees different perspective images with a left eye and a right eye for example, feeling displayed images as a stereoscopic image. Similarly, when the image signal SB is provided, as shown in FIG. 11B, the opening-closing sections 12B are put in an open state, while the opening-closing sections 12A are put in a closed state. On the display section 20, as described later, six pixels Pix that are arranged adjacently to each other at positions corresponding to the opening-closing sections 12B carry out a display operation corresponding to six perspective images included in the image signal SB. Consequently, as described later, a viewer sees different perspective images with a left eye and a right eye for example, feeling displayed images as a stereoscopic image. On the display device 1, images are displayed by alternately opening the opening-closing sections 12A and the opening-closing sections 12B in such a manner, thereby allowing the resolution of the display device to be improved.

In carrying out a normal display (two-dimensional display), on the liquid crystal barrier section 10, both of the opening-closing sections 11 and the opening-closing sections 12 (opening-closing sections 12A and 12B) are kept in an open state (transmission state) as shown in FIG. 11C. As a result, a viewer is allowed to see normal two-dimensional images as they are that are displayed on the display section 20 based on the image signal S.

(Operation and Action)

Subsequently, the description is provided on the operation and action of the display device 1 according to the embodiment of the present disclosure.

(Overview of Overall Operation)

First, the overview of overall operation for the display device 1 is described with reference to FIG. 1. The control section 40 provides the control signal to each of the display driving section 50, the backlight driving section 29, and the barrier driving section 9 based on the image signal Vdisp provided externally for controlling these sections to operate in synchronization with each other. The backlight driving section 29 drives the backlight 30 based on the backlight control signal CBL provided from the control section 40. The backlight 30 projects plane-emitting light to the display section 20. The display driving section 50 drives the display section 20 based on the image signal S provided from the control section 40. The display section 20 performs a display operation by modulating the light projected from the backlight 30. The barrier driving section 9 drives the liquid crystal barrier section 10 based on the barrier control command signal CBR provided from the control section 40. The opening-closing sections 11 and 12 (12A and 12B) on the liquid crystal barrier section 10 perform open/closed operations based on the barrier control command signal CBR, transmitting or blocking the light that is projected from the backlight 30 to transmit through the display section 20.

(Detailed Operation of Stereoscopic Display)

Next, the description is provided on the detailed operation in carrying out a stereoscopic display with reference to several figures.

FIGS. 12A and 12B each show an operation example of the display section 20 and the liquid crystal barrier section 10, wherein FIG. 12A denotes a case where the image signal SA is provided, while FIG. 12B denotes a case where the image signal SB is provided.

When the image signal SA is provided, as shown in FIG. 12A, each of the pixels Pix on the display section 20 displays pixel information P1 to P6 corresponding to each of six perspective images included in the image signal SA. At this time, the pixel information P1 to P6 are respectively displayed at the pixels Pix arranged in the vicinity of the opening-closing sections 12A. When the image signal SA is provided, on the liquid crystal barrier section 10, control is carried out so that the opening-closing sections 12A are put in an open state (transmission state), while the opening-closing sections 12B are put in a closed state. The light outgoing from each of the pixels Pix on the display section 20 is output with its angle limited by the opening-closing sections 12A. A viewer is allowed to see a stereoscopic image by viewing the pixel information P3 with a left eye and the pixel information P4 with a right eye for example.

When the image signal SB is provided, as shown in FIG. 12B, each of the pixels Pix on the display section 20 displays pixel information P1 to P6 corresponding to each of six perspective images included in the image signal SB. At this time, the pixel information P1 to P6 are respectively displayed at the pixels Pix arranged in the vicinity of the opening-closing sections 12B. When the image signal SB is provided, on the liquid crystal barrier section 10, control is carried out so that the opening-closing sections 12B are put in an open state (transmission state), while the opening-closing sections 12A are put in a closed state. The light outgoing from each of the pixels Pix on the display section 20 is output with its angle limited by the opening-closing sections 12B. A viewer is allowed to see a stereoscopic image by viewing the pixel information P3 with a left eye and the pixel information P4 with a right eye for example.

In such a manner, a viewer sees different pixel information among the pixel information P1 to P6 with a left eye and a right eye, thereby allowing to feel such pixel information as a stereoscopic image. Further, images are displayed with the opening-closing sections 12A and the opening-closing sections 12B open alternately on the time-division basis, which enables a viewer to see averaged images displayed at positions shifted from each other. This allows the display device 1 to achieve the resolution twice as high as a case where only the opening-closing sections 12A are provided. In other words, the resolution required for the display device 1 is only one third (=⅙×2) of the case of two-dimensional display.

As described above, on the liquid crystal barrier section 10, a plurality of the spacers PS to control a thickness of the liquid crystal layer 19 are provided between the transparent substrate 13 and the transparent substrate 16. Even though the spacers PS are formed of a resin material with the optical transparency, it is likely that they may reflect, scatter, or absorb a part of the light incoming into the liquid crystal barrier section 10. Because of tiny dimensions of the individual spacers PS, the spacers PS do not have significant influence, although in carrying out a stereoscopic display, they may possibly interfere with improvement of the image quality as compared with a case of two-dimensional display. This is because, in the case of a stereoscopic display, the number of the apparent pixels to form images is fewer, and the brightness of images to be displayed on a whole screen is lower than a case of two-dimensional display. In the present embodiment, therefore, each spacer PS is provided on each transparent electrode 120. The transparent electrodes 120 compose the opening-closing sections 11 that are put in a closed state (blocking state) in performing a stereoscopic display. That is, no light transmits through a region occupied by the transparent electrodes 120 in performing a stereoscopic display. Thus, the spacers PS provided on the transparent electrodes 120 are invisible from a viewer. As a result, this ensures to prevent deterioration in the image quality that is caused by the spacers PS in performing a stereoscopic display.

On the other hand, in carrying out a two-dimensional display, the opening-closing sections 11 are put in an open state (transmission state), and thus the spacers PS are also visible. However, because the number of the apparent pixels is increased, and the brightness of images to be displayed on a whole screen is also assured sufficiently as compared with a case of stereoscopic display, an influence on the image quality is quite negligible. Further, in the embodiment of the present disclosure, each of the spacers PS is arranged in a direction different from an array direction of the pixels Pix on the display section 20. This makes it possible to reduce generation of moire as compared with a case where each spacer PS is arranged in the same direction as the array direction of the pixels Pix. This may be due to the following reason. On the display section 20, border portions to separate the adjoining pixels Pix extend in the array direction of the pixels Pix (X-axis direction and Y-axis direction). That is, a region that emits no light extends in the array direction of the pixels Pix. Further, in the direction where the spacers PS are arrayed on a screen, regions (with low luminance) with brightness slightly lower than a surrounding area continue due to effect of reflection, scattering, and absorption of light that is caused by the spacers PS. In such a situation, if the spacers PS are arranged in the same direction as the array direction of the pixels Pix, the light and dark distribution in the light projected from the display section 20 and the light and dark distribution in the light transmitting through the liquid crystal barrier section 10 may easily interfere with each other. Whereas, in the present embodiment, a direction of the light and dark distribution in the light projected from the display section 20 is different from a direction of the light and dark distribution in the light transmitting through the liquid crystal barrier section 10, which ensures that such an interference is not generated easily.

[Advantageous Effects]

As described above, on the display device 1 according to the present embodiment, the array direction of two arbitrary spacers PS located at the closest positions to each other on the liquid crystal barrier section 10 is different from the array direction of the pixels Pix on the display section 20. This makes it possible to reduce generation of moire that is caused by the spacers PS. In addition, the spacers PS are provided on the transparent electrodes 120 that serve as the opening-closing sections 11 to block light in performing a stereoscopic display. This ensures to prevent deterioration in the image quality that is caused by the spacers PS, allowing the stereoscopic display with better image quality to be achieved.

Further, according to the present embodiment, each of the opening-closing sections 11 and the opening-closing sections 12 on the liquid crystal barrier section 10 extends in the direction inclined relative to the array direction of the pixels Pix on the display section 20. This ensures to improve a balance of the resolution in the horizontal direction and the resolution in the vertical direction in the stereoscopic display.

In addition, according to the present embodiment, when the VA liquid crystal is employed, there is provided the stem portion 61 that extends in a direction shifted from the vertical direction (Y-axis direction) in the transparent electrodes 110 and 120 on the transparent electrode layer 15. Further, the extending direction of the branch portions in the branch region 71 and the extending direction of the branch portions in the branch region 73 are asymmetric with respect to the stem portion 61 as an axis, while the extending direction of the branch portions in the branch region 72 and the extending direction of the branch portions in the branch region 74 are asymmetric with respect to the stem portion 61 as an axis. This makes it possible to freely set up viewing field angles in the horizontal direction.

Moreover, according to the present embodiment, when the VA liquid crystal is employed, there are provided the stem portions 61 and 62 that extend to intersect with each other on each transparent electrode 120, and the spacers PS are provided at intersections of the stem portions 61 and 62. Therefore, at the time of a two-dimensional display, this makes it possible to reduce the influence of light scattering and other disadvantages that are caused by the spacers PS on the image quality.

Further, according to the present embodiment, when the VA liquid crystal is employed, it is possible to make viewing field angles in the horizontal direction symmetric. This is because the extending direction of the branch portions in the branch region 71 and the extending direction of the branch portions in the branch region 73 are symmetric with respect to the Y-axis direction as an axis, while the extending direction of the branch portions in the branch region 72 and the extending direction of the branch portions in the branch region 74 are symmetric with respect to the Y-axis direction as an axis.

Additionally, according to the present embodiment, when the VA liquid crystal is employed, there is provided the stem portion 62 that extends in the horizontal direction (X-axis direction) within the display plane in the transparent electrodes 110 and 120 on the transparent electrode layer 15. Further, the extending direction of the branch portions in the branch region 71 and the extending direction of the branch portions in the branch region 72 are symmetric with respect to the stem portion 62 as an axis, while the extending direction of the branch portions in the branch region 73 and the extending direction of the branch portions in the branch region 74 are symmetric with respect to the stem portion 62 as an axis. This allows viewing field angles in the vertical direction to be made symmetric.

Moreover, according to the present embodiment, when the VA liquid crystal is employed, the extending direction of the branch portions in the branch regions 71 and 74 is oriented toward the direction at an angle of 45 degrees counterclockwise from the horizontal direction, while the extending direction of the branch portions in the branch regions 72 and 73 is oriented toward the direction at an angle of 45 degrees clockwise from the horizontal direction. This results in wider viewing field angles being achieved.

In addition, according to the present embodiment, when the VA liquid crystal is employed, the stem portion 61 is formed to extend in the same direction as the extending direction of the opening-closing sections 11 and 12, which allows a simplified electrode structure to be achieved as compared with a case where the stem portion 61 is formed in a stepwise pattern for example, while reducing resistance values of the transparent electrodes between upper ends and lower ends of the opening-closing sections 11 and 12.

<Second Embodiment>

Next, the description is provided on a display device according to a second embodiment of the present disclosure. With the exception that arrangement positions of the spacers PS on the liquid crystal barrier section 10 are different, the display device according to the second embodiment of the present disclosure has the same configuration as the display device 1 according to the above-described first embodiment of the present disclosure. Therefore, the description is provided hereinafter mainly on the arrangement positions of the spacers PS, and other descriptions are omitted as appropriate.

Figure 13:
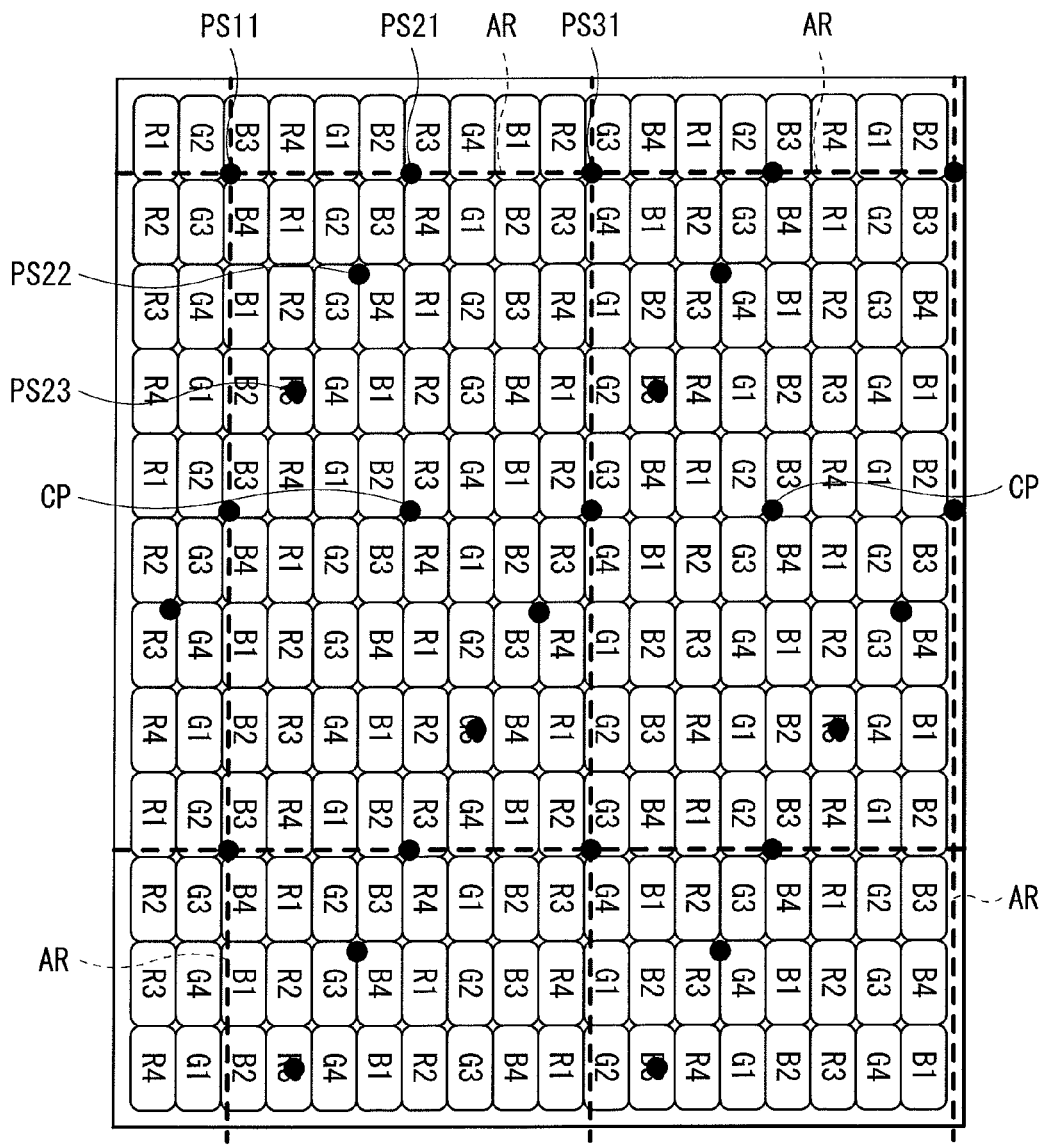
FIG. 13 is a conceptual diagram showing an array positional relationship of pixels and spacers on a display device according to a second embodiment of the present disclosure.

FIG. 13 is a schematic plan view illustrating a positional relationship of the spacers PS and the pixels Pix when the liquid crystal barrier section 10 and the display section 20 are overlapped with one another. Here, as in FIG. 5, three-color pixels Pix of R (red color), G (green color), and B (black color) are simply indicated as R, G, and B respectively. It is to be noted that each of the spacers PS is formed on the transparent electrode 120. Further, the configuration as shown in FIG. 13 corresponds to a space-division display of four perspective images instead of a time-division display, or a time-division display of eight perspective images with the number of time-division of two. That is, FIG. 13 illustrates a case where one pitch of the spacers PS in the horizontal direction of a screen is a distance equivalent to four pixels Pix. However, since some spacers PS are skipped, an interval of the spacers PS in the horizontal direction of a screen has a distance equivalent to eight pixels Pix in some locations.

On the liquid crystal barrier section 10, array patterns of the same shape that are composed of a plurality of the spacers PS are formed continuously or periodically (at spacing intervals). In concrete terms, a plurality of unit regions AR having the same array patterns that are composed of a group of the spacers PS are arranged in a matrix array on the liquid crystal barrier section 10. On the liquid crystal barrier section 10, for example, the unit regions AR having the arrangement patterns of the same shape are formed continuously in both horizontal direction (X-axis direction) and vertical direction (Y-axis direction). Alternatively, the unit regions AR having the arrangement patterns of two or more kinds of different shapes may be arrayed periodically in the horizontal direction or in the vertical direction, or in both directions.

Here, on noticing one unit region AR, for one or more of a plurality of the spacers PS, a relative position with respect to each of the corresponding pixels Pix (R, G, and B) is disposed to be different from any other relative positions. For example, when the number of the space-divided perspective images on the display section 20 is "p", an arrangement pitch of the spacers PS in the vertical direction becomes a value different from integer multiple of "p". Alternatively, assuming that the display section 20 sequentially displays p pieces of space-divided perspective images (p is an integer of two or more) with "q" pieces of temporally-divided display patterns (q is an integer of one or more), an arrangement pitch of the spacers PS in the horizontal direction is a value equal to integer multiple of (p×W/q) (W is a dimension in the horizontal direction of the pixel Pix), while an arrangement pitch of the spacers PS in the vertical direction is a value different from integer multiple of (p×L/q) (L is a dimension in the vertical direction of the pixel Pix).

In FIG. 13, for example, the spacers PS11, PS21, and PS31 are located at the bottom left corner of each of the pixels B, R, and G, respectively. That is, a relative position between each of the spacers PS11, PS21, and PS31 and the pixels B3, R3, and G3 is identical (equivalent). On the other hand, for the spacers PS22 and PS23 that are located on the same transparent electrode 120 as the spacer PS21, a relative position with respect to each of the corresponding pixels G22 and R23 is different from a relative position between the spacer PS21 and the pixel R11. In concrete terms, the spacer PS22 is located at upper right corner of the pixel G22, and the spacer PS23 is located nearly at a center of the pixel G23. As a result, the luminance level of each pixel Pix visible from a viewer for one unit region may be different. In other words, since the bright-visible pixels Pix and the dark-visible pixels Pix are mixed at one unit region AR, viewing the unit region AR as a whole, the luminance level is maintained almost constant.

Figure 14:
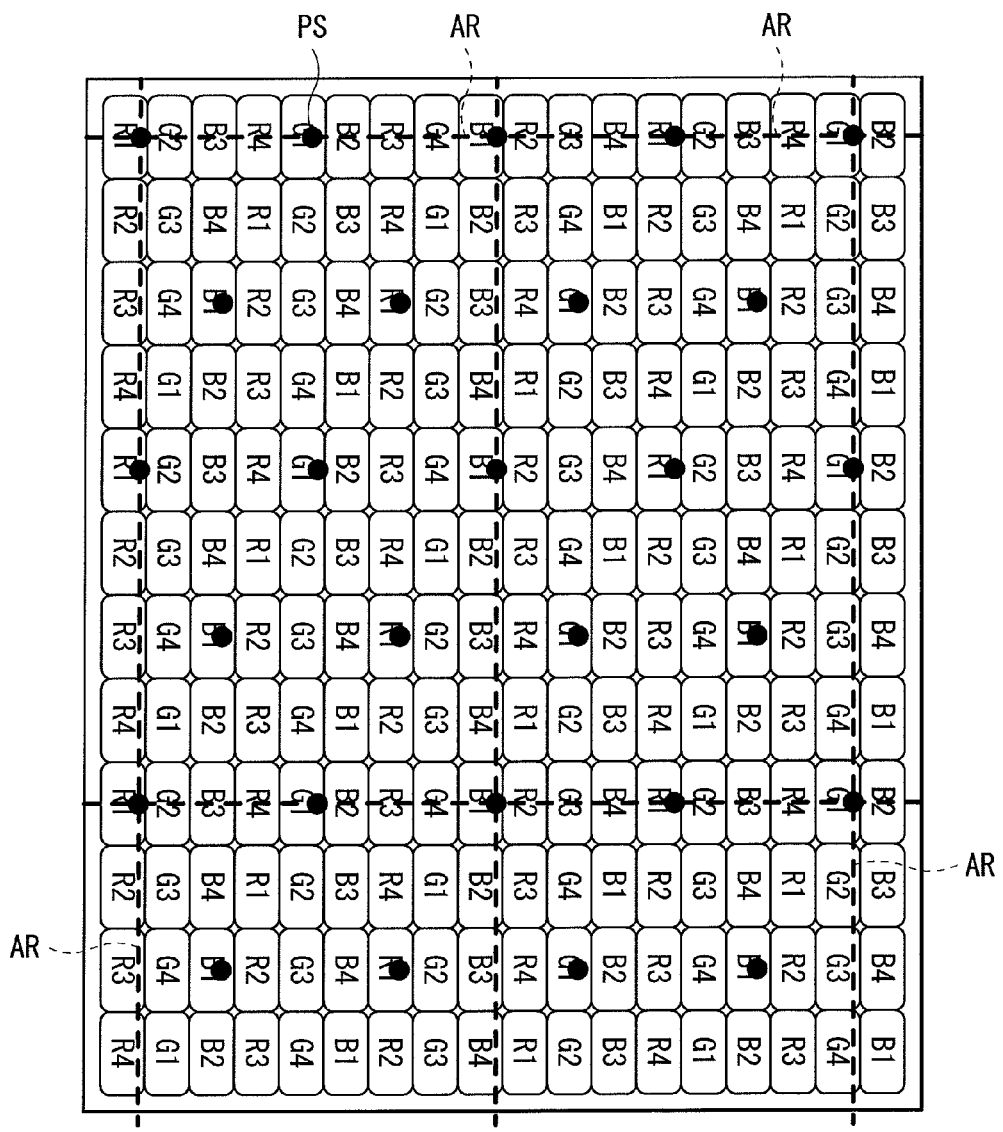
FIG. 14 is a conceptual diagram showing a positional relationship of pixels and spacers on a display device as a reference example.

Whereas, assuming that a relative positional relationship between the pixels Pix and the spacers PS is all identical (equivalent) as in a reference example as shown in FIG. 14, pixel rows (in the oblique direction) including the pixels Pix overlapped with the spacers PS have luminance relatively lower than any other pixel rows. Because such pixel rows with low luminance are arrayed periodically, a cyclic light and dark distribution occurs, resulting in moire caused by the spacers PS being recognized by a viewer.

On the other hand, according to the present embodiment, it is possible to maintain almost constant luminance level at each unit region AR. Therefore, almost constant luminance level is allowed to be kept for a screen as a whole in which such unit regions AR are arranged in a matrix array. As a result, this makes it possible to effectively eliminate moire caused by the spacers PS.

Further, according to the present embodiment, a plurality of the spacers PS at the unit regions AR compose arrangement patterns symmetric with respect to a point around a center position CP of the unit region AR as a rotation center point. This allows any variations in the in-plane direction of a gap between the transparent electrode layer 15 and the transparent electrode layer 17 to be further reduced.

In addition, according to the present embodiment, a plurality of the unit regions AR, having the same array patterns that are composed of a group of spacers PS, are arranged continuously or periodically. Consequently, it is possible to efficiently perform inspections at the manufacturing phase or inspections after finishing.

Figure 15:
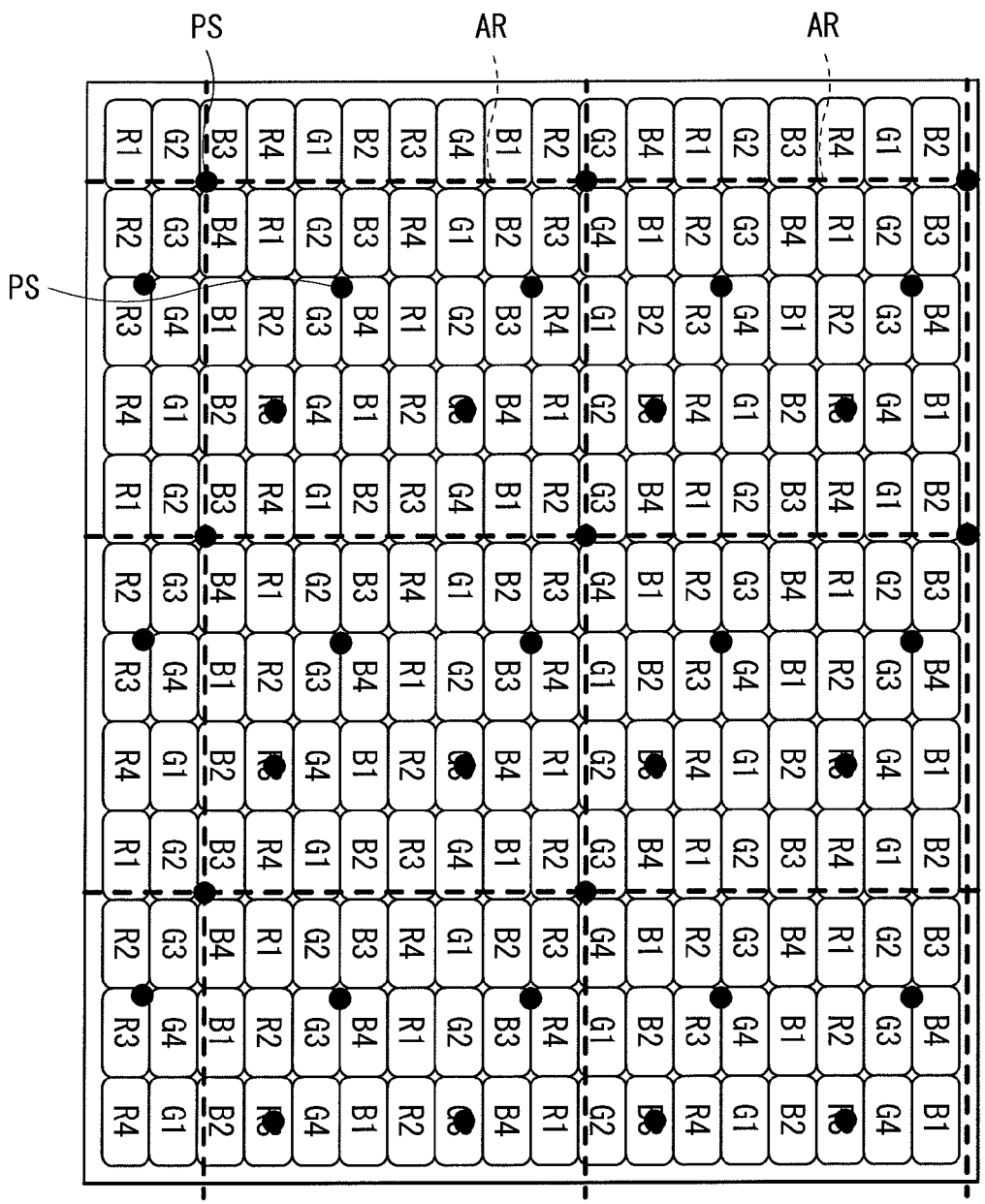
FIG. 15 is a conceptual diagram showing a first modification example related to the array positional relationship of the pixels and spacers as shown in FIG. 13.

It is to be noted that the array pattern of the spacers PS according to the embodiment of the present disclosure is not limited to that shown in FIG. 13, and an array pattern as shown in FIG. 15 for example (first modification example) may be used alternatively. In FIG. 15, the unit region AR has a half of an area of the example shown in FIG. 13.

Figure 16:
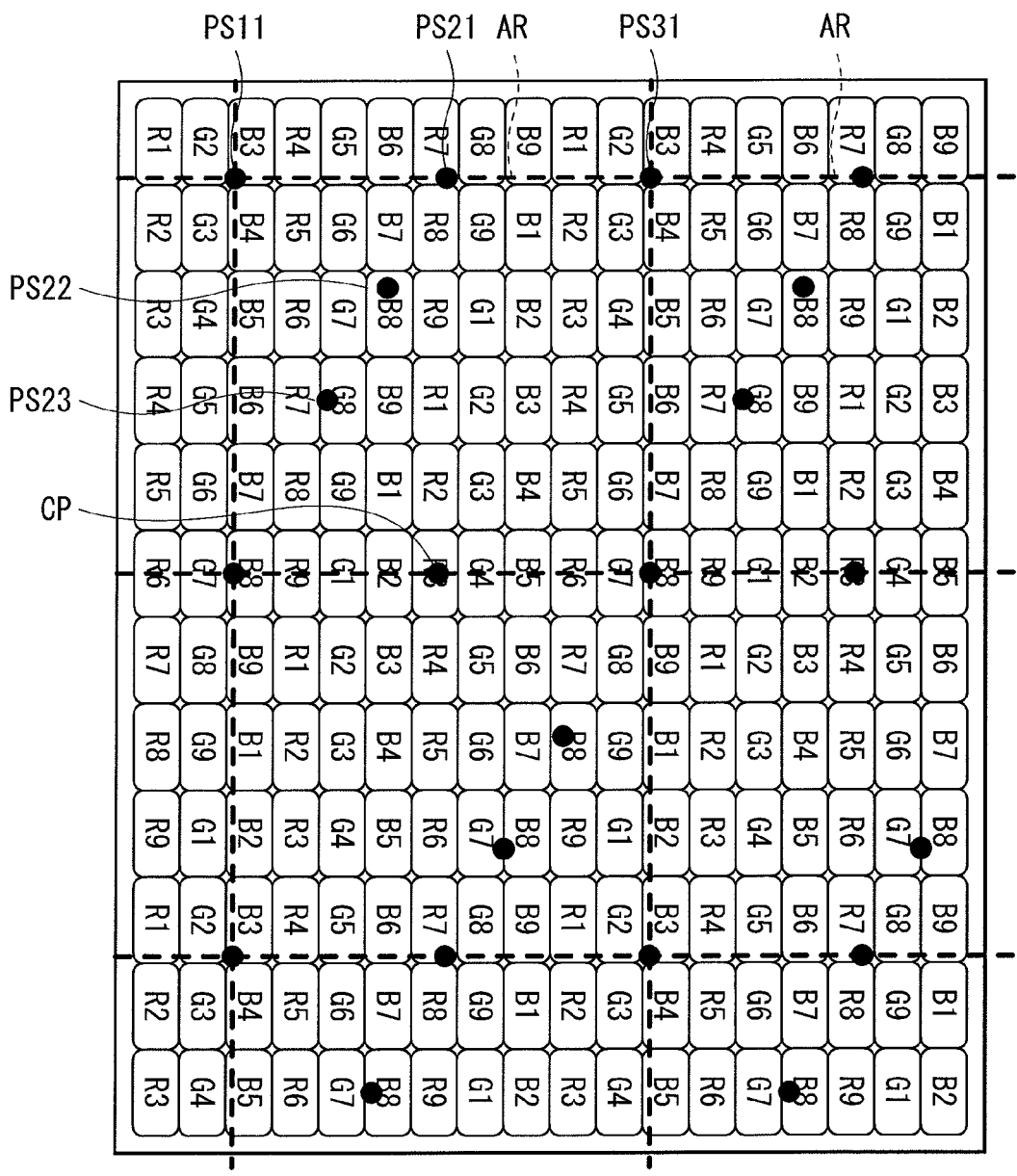
FIG. 16 is a conceptual diagram showing a second modification example related to the array positional relationship of the pixels and spacers as shown in FIG. 13.
Figure 17:
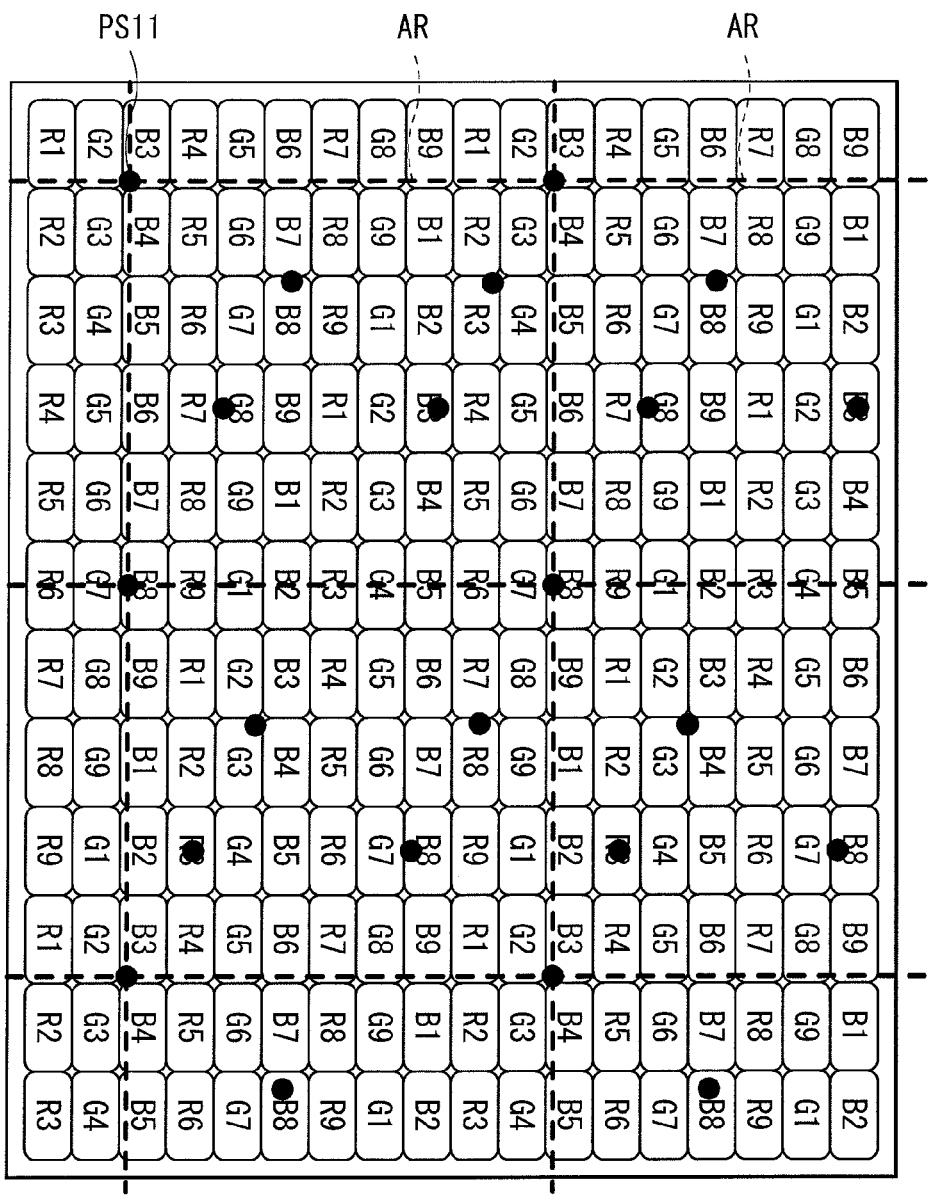
FIG. 17 is a conceptual diagram showing a third modification example related to the array positional relationship of the pixels and spacers as shown in FIG. 13.

In addition, according to the present embodiment, it is possible to arbitrarily set up the number of the time-division and the number of the space-division. For example, the configuration as shown in FIG. 16 corresponds to a case where an array pattern as shown in FIG. 13 is arranged with the number of the time-division of two and the number of the perspective images of nine (one pitch of the spacers PS in the horizontal direction of a screen is a distance equivalent to 4.5 pieces of the pixels Pix) (second modification example). Similarly, the configuration as shown in FIG. 17 corresponds to a case where an array pattern as shown in FIG. 15 is arranged with the number of the time-division of two and the number of the perspective images of nine (one pitch of the spacers PS in the horizontal direction of a screen is a distance equivalent to 4.5 pieces of the pixels Pix) (third modification example). Note that, since several spacers PS are skipped in configuration examples as shown in FIG. 16 and FIG. 17 as well, an spacing interval of the spacers PS in the horizontal direction of a screen has a distance equivalent to nine pieces of the pixels Pix in some locations.

Figure 18:
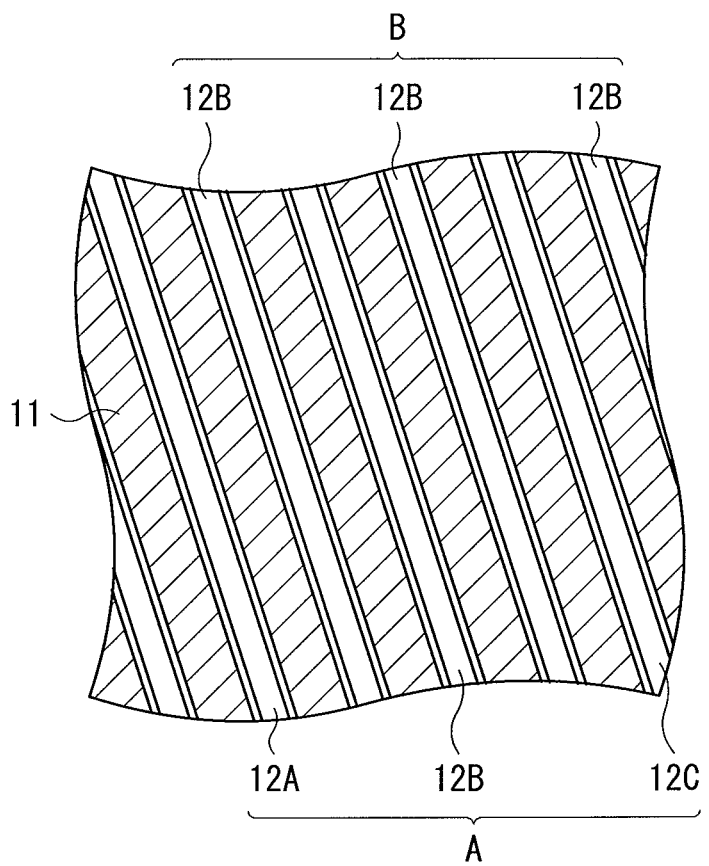
FIG. 18 is an explanatory diagram showing a configuration example of the opening-closing sections on the liquid crystal barrier section as a fourth modification example.

The present technology is described hereto by citing several embodiments, although the present technology is not limited to those embodiments and the modifications, and a variety of modifications are available. For example, according to the above-described embodiments of the present disclosure, the opening-closing sections 11 and 12 on the liquid crystal barrier section 10 extend in the oblique direction diagonally right up relative to the horizontal direction (X-axis direction). In the present technology, however, like a modification example as shown in FIG. 18 (fourth modification example), the opening-closing sections 11 and 12 may extend in the oblique direction diagonally left up relative to the horizontal direction. Further, the angle θ1 is defined as 18 degrees in the above-described embodiments of the present disclosure, although the present technology may take any other angle values.

Figure 19A:
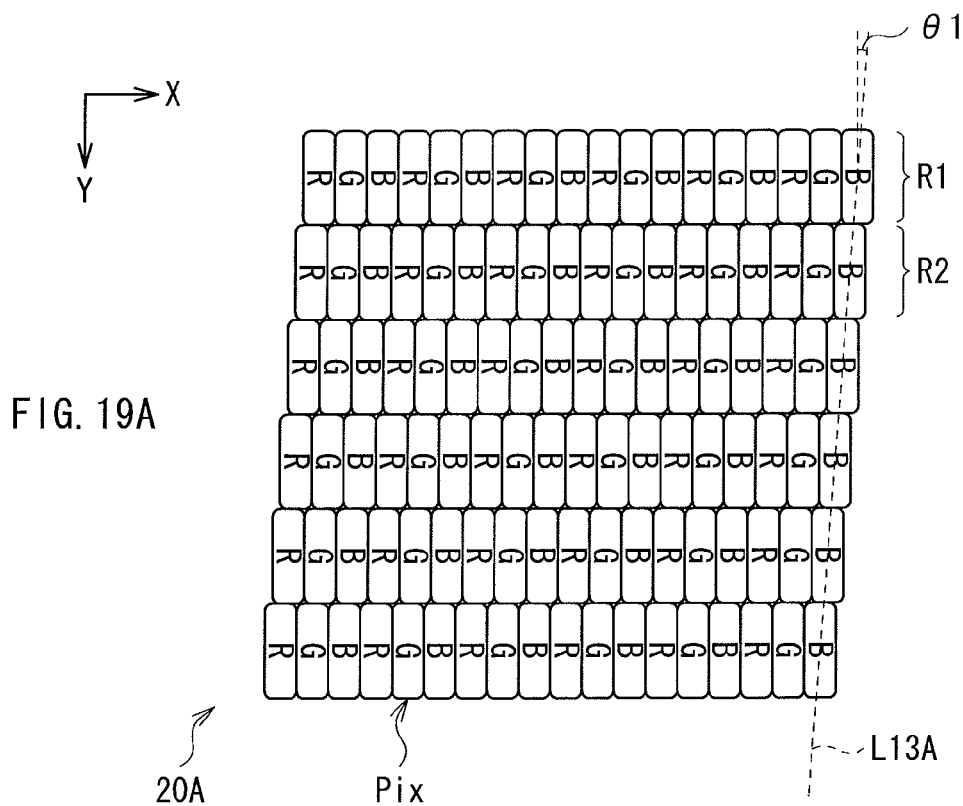
FIGS. 19A and 19B are explanatory diagrams showing a pixel array on the display section and a configuration example of the opening-closing sections on the liquid crystal barrier section as a fifth modification example.
Figure 19B:
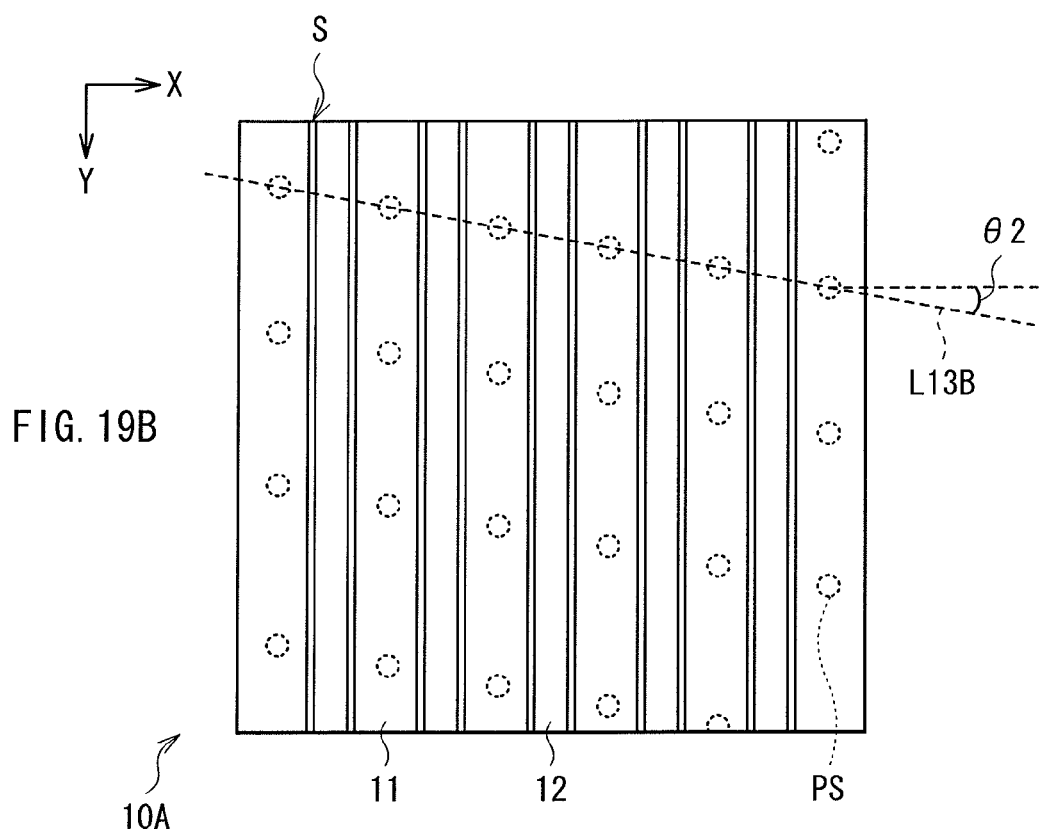

Further, according to the above-described embodiments of the present disclosure, the array direction of the pixels Pix on the display section 20 is defined as the horizontal direction and the vertical direction, and the extending direction of the opening-closing sections 11 and 12 on the liquid crystal barrier section 10 is defined as the oblique direction, although the present technology is not limited to such an arrangement. For example, as shown in FIGS. 19A and 19B, the array direction of the pixels Pix may be defined as the horizontal direction and the oblique direction, and the extending direction of the opening-closing sections 11 and 12 on the liquid crystal barrier section 10 may be defined as the vertical direction. FIG. 19A denotes a pixel array of a display section 20A as a modification example (fifth modification example), while FIG. 19B denotes an arrangement configuration of opening-closing sections on a liquid crystal barrier section 10A as the fifth modification example. As shown in FIG. 19A, on the display section 20A according to this modification example, a plurality of rows of the pixels Pix that extend in the X-axis direction and are adjacent to each other in the Y-axis direction are formed. Here, on noticing the pixel rows L1 and L2 for example, a virtual straight line L13A passing through a center position of each pixel Pix at the pixel row R1 and a center position of each pixel Pix at the pixel row R2 forms the angle of θ1 relative to the vertical direction (Y-axis direction). Further, as shown in FIG. 19B, the spacers PS are arranged along the opening-closing sections that are put in a closed state (blocking state) in performing a stereoscopic display, and are arrayed along a virtual straight line L13B inclined at an angle of θ2 (for example, 64 degrees) relative to the horizontal direction (X-axis direction). In such a modification example as well, the advantageous effects similar to the above-described embodiments of the present disclosure are achieved.

In addition, according to the above-described embodiments of the present disclosure, the spacers PS provided on the adjoining transparent electrodes 120 are arrayed on a virtual straight line, although the spacers PS may be provided at positions deviated from the virtual straight line alternatively. Further, in the embodiment of the present disclosure, the spacers PS provided on the same transparent electrode 120 are arranged at fixed intervals along the extending direction of that transparent electrode 120, although the spacers PS may be arranged at any different intervals.

Moreover, according to the above-described embodiments of the present disclosure, the liquid crystal barrier section 10, the display section 20, and the backlight 30 on the display device 1 are disposed in this order from a viewer side, although the arrangement is not limited thereto. Alternatively, like a display device 1A as a modification example (sixth modification example) as shown in FIGS. 20A and 20B, the arrangement in the order of the display section 20, the liquid crystal barrier section 10, and the backlight 30 from a viewer side is applicable.

Figure 20A:
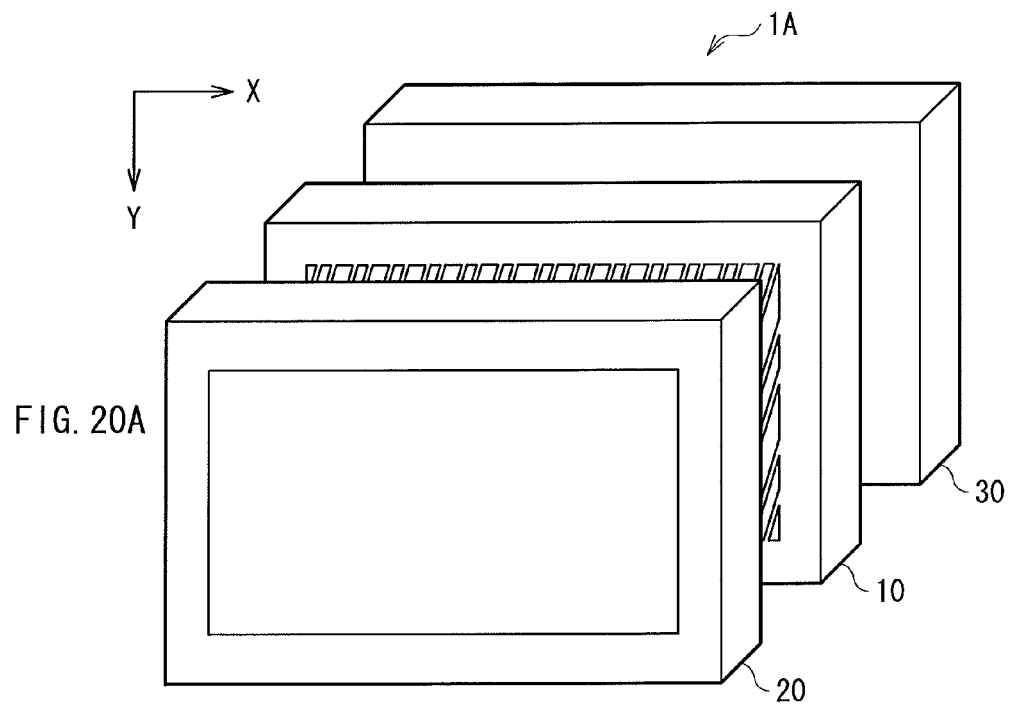
FIGS. 20A and 20B are each an explanatory diagram showing a configuration example of the display device as a sixth modification example.
Figure 20B:
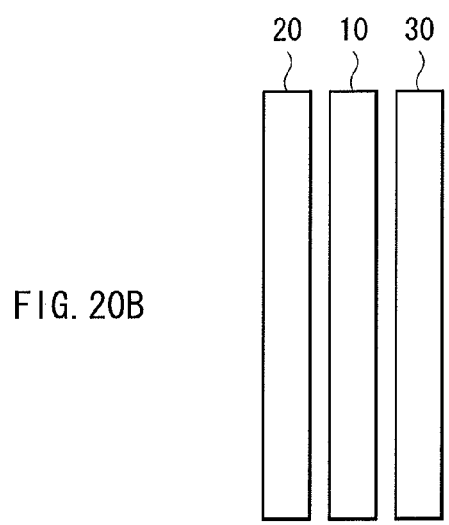

FIGS. 21A and 21B shows an operation example of the display section 20 and the liquid crystal barrier section 10 according to the sixth modification example as shown in FIGS. 20A and 20B. In particular, FIG. 21A denotes a case where the image signal SA is provided, while FIG. 21B denotes a case where the image signal SB is provided. In the sixth modification example, the light projected from the backlight 30 comes into the liquid crystal barrier section 10 at first. Thereafter, the light transmitting through the opening-closing sections 12A and 12B among such light signals is modulated on the display section 20, while six perspective images being output.

Further, according to the above-described embodiments of the present disclosure, the opening-closing sections 12 compose two groups, although the arrangement is not limited thereto. Alternatively, the opening-closing sections 12 may compose three or more groups. This ensures to further improve the display resolution.

In addition, according to the above-described embodiments of the present disclosure, the display section 20 is a liquid crystal display section, although the arrangement is not limited thereto. Alternatively, an EL (Electro Luminescence) display section using organic EL for example may be used. Such a case eliminates the need for use of the backlight driving section 29 and the backlight 30 as shown in FIG. 1.

Further, according to the above-described embodiments of the present disclosure, the description is provided on a case where the liquid crystal layer 19 is composed of a TN liquid crystal or a VA liquid crystal, although the present technology is not limited thereto. Alternatively, a liquid crystal such as an IPS mode may be used.

Thus, it is possible to achieve at least the following configurations from the above-described example embodiments and the modifications of the disclosure.

(1) A display device, including:
a display section including a plurality of display pixels; and
a barrier section including a plurality of sub-regions that allow light to transmit therethrough and block the light, the barrier section including
a pair of substrates,
a liquid crystal layer interposed between the substrates, and
a plurality of spacers interposed between the substrates, an array direction of the spacers adjacent to each other of the plurality of spacers being different from an array direction of the display pixels.

(2) The display device according to (1), wherein an array direction of the two spacers located closest to each other of the plurality of spacers is different from the array direction of the display pixels.

(3) The display device according to (1) or (2), wherein each of the sub-regions extends in a direction inclined relative to the array direction of the display pixels in the display section.

(4) The display device according to any one of (1) to (3), wherein the sub-regions include first sub-regions that allow the light to transmit therethrough and second sub-regions that block the light, and the spacers are provided in the second sub-regions.

(5) The display device according to (4), wherein the first sub-regions and the second sub-regions are disposed alternately one-by-one in a direction different from an extending direction of the first sub-regions and an extending direction of the second sub-regions, and
the array direction of the spacers, provided in the second sub-regions that are adjacent to each other, is different from the array direction of the display pixels.

(6) The display device according to any one of (1) to (5), wherein
the barrier section includes a pair of electrodes that provide a voltage to the liquid crystal layer,
a first electrode, a second electrode, or both of the first and the second electrodes of the pair of electrodes is divided into a plurality of sub-electrodes for each of the sub-regions, and
the spacers are provided at positions overlapped with the sub-electrodes.

(7) The display device according to (6), wherein the sub-regions include first sub-regions that allow the light to transmit therethrough and second sub-regions that block the light, and the spacers are provided in the second sub-regions.

(8) The display device according to (6), wherein each of the sub-electrodes includes a first stem portion and a second stem portion that extend to intersect with each other, and the spacers are located at intersections of the first stem portions and the second stem portions.

(9) The display device according to any one of (1) to (8), wherein a plurality of display modes are included, the display modes including a three-dimensional image display mode and a two-dimensional image display mode,
the sub-regions include first sub-regions and second sub-regions,
the display section displays a plurality of different perspective images, and the first sub-regions are in a transmission state and the second sub-regions are in a blocking state, to allow a three-dimensional image to be displayed in the three-dimensional image display mode, and
the display section displays a single perspective image, and the first sub-regions and the second sub-regions are in the transmission state, to allow a two-dimensional image to be displayed in the two-dimensional image display mode.

(10) The display device according to (9), wherein the spacers are provided in the second sub-regions.

(11) The display device according to any one of (1) to (10), wherein the display section includes a signal line and a scanning line providing a voltage to the display pixels, and the array direction of the display pixels is a direction along an extending direction of the signal line and an extending direction of the scanning line.

(12) The display device according to any one of (1) to (11), wherein the spacers configure a plurality of array patterns arranged periodically in a horizontal direction, in a vertical direction, or in the horizontal and the vertical directions.

(13) The display device according to any one of (1) to (12), wherein the spacers configure an arrangement pattern of a same shape, for each unit region arranged in the horizontal direction, in the vertical direction, or in the horizontal and the vertical directions.

(14) The display device according to (13), wherein one or more of the spacers, in each of the unit regions, is disposed to allow a relative position between the one or more spacers and the corresponding one or more display pixels to be different from a relative position between the other spacers and the corresponding other display pixels.

(15) The display device according to (13) or (14), wherein the spacers, in each of the unit regions, configure an arrangement pattern that is symmetric with respect to a point, as a rotation center point, around a center position of each of the unit regions.

(16) The display device according to any one of (1) to (15), wherein arrangement patterns of a same shape configured by the spacers are provided periodically in the barrier section.

(17) The display device according to any one of (1) to (16), wherein
the display section displays p-number of spatially-divided perspective images, and
an arrangement pitch of the spacers in a horizontal direction, in a vertical direction, or in the horizontal and the vertical directions has a value different from an integer multiple of p, where p is an integer equal to or greater than two.

(18) The display device according to any one of (1) to (17), wherein
the display section sequentially displays, based on q-number of temporally-divided display patterns, p-number of spatially-divided perspective images, and
an arrangement pitch of the spacers in a horizontal direction has a value equal to an integer multiple defined by p×W/q, and the arrangement pitch of the spacers in a vertical direction has a value different from an integer multiple defined by p×L/q, where p is an integer equal to or greater than two, q is an integer equal to or greater than one, W is a dimension of any one of the display pixels in the horizontal direction, and L is a dimension of any one of the display pixels in the vertical and the horizontal directions.

(19) A display device, including:
a display section including a plurality of display pixels; and
a barrier section including a plurality of sub-regions that allow light to transmit therethrough and block the light, the barrier section including
a pair of substrates,
a liquid crystal layer interposed between the substrates, and
a plurality of spacers interposed between the substrates, one or more of the spacers being disposed to allow a relative position between the one or more spacers and the corresponding one or more display pixels to be different from a relative position between the other spacers and the corresponding other display pixels.

The present disclosure contains subject matter related to that disclosed in Japanese Priority Patent Application JP 2011-094267 filed in the Japan Patent Office on Apr. 20, 2011 and Japanese Priority Patent Application JP 2011-251676 filed in the Japan Patent Office on Nov. 17, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
a display section including a two-dimensional array of display pixels; and
a barrier section including
a plurality of sub-regions that selectively transmit light therethrough and selectively block the light, the plurality of sub-regions extending in a first direction,
a pair of substrates,
a liquid crystal layer interposed between the substrates, and
a plurality of spacers interposed between the substrates, wherein the plurality of spacers includes a first spacer and a second spacer, the second spacer being closest to the first spacer of the plurality of spacers, an axis between the first spacer and the second spacer being offset from axes of the two-dimensional array of display pixels and being parallel or perpendicular to the first direction in which the plurality of sub-regions extend.

2. The display device according to claim 1, wherein the plurality of sub-regions include first sub-regions that selectively transmit the light therethrough and second sub-regions that selectively block the light, and the plurality of spacers is provided in the second sub-regions.

3. The display device according to claim 2, wherein
the first sub-regions and the second sub-regions are disposed alternately one-by-one in a second direction different from an extending direction of the first sub-regions and an extending direction of the second sub-regions, and
the first spacer and the second spacer are provided in the second sub-regions that are adjacent to each other.

4. The display device according to claim 1, wherein
the barrier section includes a pair of electrodes that provide a voltage to the liquid crystal layer,
a first electrode and/or a second electrode of the pair of electrodes is divided into a plurality of sub-electrodes for each of the sub-regions, and
the plurality of spacers is provided at positions overlapped with the sub-electrodes.

5. The display device according to claim 4, wherein the sub-regions include first sub-regions that selectively transmit the light therethrough and second sub-regions that selectively block the light, and the plurality of spacers is provided in the second sub-regions.

6. The display device according to claim 4, wherein each of the sub-electrodes includes a first stem portion and a second stem portion that extend to intersect with each other, and the plurality of spacers is located at intersections of the first stem portion and the second stem portion.

7. The display device according to claim 1, wherein
the display device is configured to use a plurality of display modes, the plurality of display modes including a three-dimensional image display mode and a two-dimensional image display mode,
the sub-regions include first sub-regions and second sub-regions,
the display section is configured to display a plurality of different perspective images, and the first sub-regions are in a transmission state and the second sub-regions are in a blocking state, such that a three-dimensional image is displayed in the three-dimensional image display mode, and the display section is configured to display a single perspective image, and the first sub-regions and the second sub-regions are in the transmission state, such that a two-dimensional image is displayed in the two-dimensional image display mode.

8. The display device according to claim 7, wherein the plurality of spacers is provided in the second sub-regions.

9. The display device according to claim 1, wherein the display section includes a signal line and a scanning line providing a voltage to the display pixels, and an extending direction of the signal line and an extending direction of the scanning line are parallel to the axes of the two-dimensional array of display pixels.

10. The display device according to claim 1, wherein the plurality of spacers configures a plurality of array patterns arranged periodically in a horizontal direction and/or a vertical direction.

11. The display device according to claim 10, wherein the plurality of spacers configures an arrangement pattern of a same shape, for each unit region arranged in the horizontal direction and/or the vertical direction.

12. The display device according to claim 11, wherein one or more of the plurality of spacers, in each of the unit regions, is disposed such that a position of a first spacer of the plurality of spacers relative to a first display pixel is different from a position of a second spacer of the plurality of spacers relative to a second display pixel, wherein the first spacer at least partially overlaps the first display pixel and the second spacer at least partially overlaps the second display pixel.

13. The display device according to claim 11, wherein the plurality of spacers, in each of the unit regions, configures an arrangement pattern that is symmetric with respect to a point, as a rotation center point, around a center position of each of the unit regions.

14. The display device according to claim 1, wherein arrangement patterns of a same shape configured by the plurality of spacers are provided periodically in the barrier section.

15. The display device according to claim 1, wherein the display section displays p-number of spatially-divided perspective images, and
an arrangement pitch of the plurality of spacers in a horizontal direction and/or a vertical direction has a value different from an integer multiple of p, where p is an integer equal to or greater than two.

16. The display device according to claim 1, wherein the display section sequentially displays, based on q-number of temporally-divided display patterns, p-number of spatially-divided perspective images, and
an arrangement pitch of the plurality of spacers in a horizontal direction has a value equal to an integer multiple defined by p × W/q, and the arrangement pitch of the plurality of spacers in a vertical direction has a value different from an integer multiple defined by p × L/q, where p is an integer equal to or greater than two, q is an integer equal to or greater than one, W is a dimension of any display pixel in the horizontal direction, and L is a dimension of any display pixel in the vertical direction and the horizontal direction.

17. A display device, comprising:
a display section including a first display pixel and a second display pixel; and
a barrier section including
a plurality of sub-regions that selectively transmit light therethrough and selectively block the light,
a pair of substrates,
a liquid crystal layer interposed between the substrates, and
a first spacer and a second spacer interposed between the substrates, the first spacer at least partially overlapping the first display pixel, the second spacer at least partially overlapping the second display pixel, wherein a position of the first spacer relative to the first display pixel is different from a position of the second spacer relative to the second display pixel, and wherein the first spacer and the second spacer are column spacers.

* * * * *